(12) United States Patent
Shipton et al.

(10) Patent No.: US 8,005,636 B2
(45) Date of Patent: *Aug. 23, 2011

(54) METHOD OF CONTROLLING CLOCK SIGNAL

(75) Inventors: Gary Shipton, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/564,045

(22) Filed: Sep. 21, 2009

(65) Prior Publication Data

US 2010/0010767 A1    Jan. 14, 2010

Related U.S. Application Data

(63) Continuation of application No. 11/951,213, filed on Dec. 5, 2007, now Pat. No. 7,610,163, which is a continuation of application No. 11/488,841, filed on Jul. 19, 2006, now Pat. No. 7,328,115, which is a continuation of application No. 11/212,702, filed on Aug. 29, 2005, now Pat. No. 7,171,323, which is a continuation of application No. 10/727,210, filed on Dec. 2, 2003, now Pat. No. 7,096,137.

(30) Foreign Application Priority Data

Dec. 2, 2002  (AU) ............................... 2002953134
Dec. 2, 2002  (AU) ............................... 2002953135

(51) Int. Cl.
    *G06F 19/00*    (2006.01)

(52) U.S. Cl. ........ 702/106; 327/156; 327/158; 327/263; 323/313; 331/16; 331/57

(58) Field of Classification Search ............... 702/106; 327/156, 158, 263; 323/313; 331/16, 57
    See application file for complete search history.

(56) References Cited

U.S. PATENT DOCUMENTS

| | | | | |
|---|---|---|---|---|
| 4,625,181 A | * | 11/1986 | Bichler | ........................ 331/57 |
| 4,932,232 A | | 6/1990 | Ballyns et al. | |
| 5,327,404 A | | 7/1994 | Nolan | |
| 5,428,309 A | * | 6/1995 | Yamauchi et al. | ............ 327/158 |
| 5,530,407 A | | 6/1996 | Yabe et al. | |
| 5,581,198 A | | 12/1996 | Trimberger | |

(Continued)

FOREIGN PATENT DOCUMENTS

EP    0863004 A2    9/1998

(Continued)

*Primary Examiner* — Carol S Tsai

(57) ABSTRACT

A method of controlling a clock signal with a print controller is provided. In response to receiving an external signal, the print controller determines the number of cycles of a clock signal generated by a ring oscillator of the print controller during a predetermined number of cycles of the external signal or the number of cycles of the external signal during a predetermined number of cycles of the clock signal and outputs the determined number of cycles to an external circuit. In response to receiving a trim value from clock trim circuitry of the print controller which trims the frequency of the clock signal based on the determined number of cycles from the external circuit, the trim value is stored in memory of the print controller. The clock trim circuitry is controlled to trim the frequency of the clock signal generated by the ring oscillator using the trim value.

9 Claims, 23 Drawing Sheets

U.S. PATENT DOCUMENTS

| | | | |
|---|---|---|---|
| 5,587,691 A | 12/1996 | Yabe et al. | |
| 5,621,698 A | 4/1997 | Lee | |
| 5,661,428 A * | 8/1997 | Li et al. | 323/313 |
| 5,673,316 A | 9/1997 | Auerbach et al. | |
| 5,796,312 A | 8/1998 | Hull et al. | |
| 5,796,313 A | 8/1998 | Eitan | |
| 5,835,424 A | 11/1998 | Kikukawa et al. | |
| 5,877,657 A | 3/1999 | Yoshinaka | |
| 6,011,386 A * | 1/2000 | Li et al. | 323/313 |
| 6,114,920 A | 9/2000 | Moon et al. | |
| 6,246,970 B1 | 6/2001 | Silverbrook et al. | |
| 6,252,471 B1 | 6/2001 | Salter et al. | |
| 6,283,572 B1 | 9/2001 | Kumar et al. | |
| 6,294,962 B1 | 9/2001 | Mar | |
| 6,327,199 B1 | 12/2001 | Fister | |
| 6,354,689 B1 | 3/2002 | Couwenhoven et al. | |
| 6,453,196 B1 | 9/2002 | Von Arx et al. | |
| 6,515,551 B1 | 2/2003 | Mar et al. | |
| 6,545,950 B1 | 4/2003 | Walukas et al. | |
| 6,590,414 B2 | 7/2003 | Signorelli et al. | |
| 6,651,149 B1 | 11/2003 | Iwasaki | |
| 6,671,221 B2 | 12/2003 | Beer et al. | |
| 6,753,739 B1 | 6/2004 | Mar et al. | |
| 6,778,024 B2 | 8/2004 | Gupta et al. | |
| 6,807,225 B1 | 10/2004 | Tonietto et al. | |
| 6,816,750 B1 | 11/2004 | Klaas | |
| 6,819,195 B1 | 11/2004 | Blanchard et al. | |
| 6,900,675 B2 | 5/2005 | Briones | |
| 7,071,751 B1 * | 7/2006 | Kaviani | 327/263 |
| 7,124,170 B1 | 10/2006 | Sibert | |
| 7,192,114 B2 | 3/2007 | Suzuki et al. | |
| 7,200,759 B2 | 4/2007 | Oerlemans | |
| 7,224,803 B2 | 5/2007 | Cheng | |
| 7,278,697 B2 | 10/2007 | Plunkett | |
| 7,467,839 B2 | 12/2008 | Walmsley | |
| 7,611,215 B2 | 11/2009 | Walmsley | |
| 2001/0010724 A1 | 8/2001 | Murakami | |
| 2002/0013898 A1 | 1/2002 | Sudia et al. | |
| 2002/0060707 A1 | 5/2002 | Yu et al. | |
| 2002/0103999 A1 | 8/2002 | Camnisch et al. | |
| 2004/0046811 A1 | 3/2004 | D'Souza et al. | |
| 2004/0095194 A1 * | 5/2004 | Gupta et al. | 331/16 |
| 2004/0260932 A1 * | 12/2004 | Blangy et al. | 713/189 |
| 2005/0046452 A1 * | 3/2005 | Briones | 327/156 |
| 2005/0286287 A1 | 12/2005 | Park et al. | |
| 2006/0052962 A1 * | 3/2006 | Shipton et al. | 702/106 |
| 2006/0238216 A1 * | 10/2006 | Yada et al. | 326/3 |

FOREIGN PATENT DOCUMENTS

| | | |
|---|---|---|
| EP | 0963854 A | 12/1999 |
| EP | 0974467 A1 | 1/2000 |
| EP | 0983855 A2 | 3/2000 |
| EP | 1157840 A2 | 11/2001 |
| WO | WO 99/08875 A1 | 2/1999 |
| WO | WO 00/64679 A | 11/2000 |

* cited by examiner

METHOD OF CONTROLLING CLOCK SIGNAL

CROSS REFERENCE TO RELATED APPLICATIONS

The present application is a Continuation of U.S. application Ser. No. 11/951,213 filed Dec. 5, 2007, which is a Continuation of U.S. application Ser. No. 11/488,841 filed Jul. 19, 2006, now issued U.S. Pat. No. 7,328,115, which is a Continuation of U.S. application Ser. No. 11/212,702 filed Aug. 29, 2005, now issued U.S. Pat. No. 7,171,323, which is a Continuation of U.S. application Ser. No. 10/727,210 filed Dec. 2, 2003, now issued U.S. Pat. No. 7,096,137 all of which is herein incorporated by reference.

FIELD OF INVENTION

The present invention relates to a mechanism for adjusting an onboard system clock on an integrated circuit.

The invention has primarily been developed for use in a printer that uses a plurality of security chips to ensure that modifications to operating parameters can only be modified in an authorized manner, and will be described with reference to this application. However, it will be appreciated that the invention can be applied to other fields in which analogous problems are faced.

BACKGROUND OF INVENTION

Manufacturing a printhead that has relatively high resolution and print-speed raises a number of problems.

Difficulties in manufacturing pagewidth printheads of any substantial size arise due to the relatively small dimensions of standard silicon wafers that are used in printhead (or printhead module) manufacture. For example, if it is desired to make an 8 inch wide pagewidth printhead, only one such printhead can be laid out on a standard 8-inch wafer, since such wafers are circular in plan. Manufacturing a pagewidth printhead from two or more smaller modules can reduce this limitation to some extent, but raises other problems related to providing a joint between adjacent printhead modules that is precise enough to avoid visible artefacts (which would typically take the form of noticeable lines) when the printhead is used. The problem is exacerbated in relatively high-resolution applications because of the tight tolerances dictated by the small spacing between nozzles.

The quality of a joint region between adjacent printhead modules relies on factors including a precision with which the abutting ends of each module can be manufactured, the accuracy with which they can be aligned when assembled into a single printhead, and other more practical factors such as management of ink channels behind the nozzles. It will be appreciated that the difficulties include relative vertical displacement of the printhead modules with respect to each other.

Whilst some of these issues may be dealt with by careful design and manufacture, the level of precision required renders it relatively expensive to manufacture printheads within the required tolerances. It would be desirable to provide a solution to one or more of the problems associated with precision manufacture and assembly of multiple printhead modules to form a printhead, and especially a pagewidth printhead.

In some cases, it is desirable to produce a number of different printhead module types or lengths on a substrate to maximise usage of the substrate's surface area. However, different sizes and types of modules will have different numbers and layouts of print nozzles, potentially including different horizontal and vertical offsets. Where two or more modules are to be joined to form a single printhead, there is also the problem of dealing with different seam shapes between abutting ends of joined modules, which again may incorporate vertical or horizontal offsets between the modules. Printhead controllers are usually dedicated application specific integrated circuits (ASICs) designed for specific use with a single type of printhead module, that is used by itself rather than with other modules. It would be desirable to provide a way in which different lengths and types of printhead modules could be accounted for using a single printer controller. Printer controllers face other difficulties when two or more printhead modules are involved, especially if it is desired to send dot data to each of the printheads directly (rather than via a single printhead connected to the controller). One concern is that data delivered to different length controllers at the same rate will cause the shorter of the modules to be ready for printing before any longer modules. Where there is little difference involved, the issue may not be of importance, but for large length differences, the result is that the bandwidth of a shared memory from which the dot data is supplied to the modules is effectively left idle once one of the modules is full and the remaining module or modules is still being filled. It would be desirable to provide a way of improving memory bandwidth usage in a system comprising a plurality of printhead modules of uneven length.

In any printing system that includes multiple nozzles on a printhead or printhead module, there is the possibility of one or more of the nozzles failing in the field, or being inoperative due to manufacturing defect. Given the relatively large size of a typical printhead module, it would be desirable to provide some form of compensation for one or more "dead" nozzles. Where the printhead also outputs fixative on a per-nozzle basis, it is also desirable that the fixative is provided in such a way that dead nozzles are compensated for.

A printer controller can take the form of an integrated circuit, comprising a processor and one or more peripheral hardware units for implementing specific data manipulation functions. A number of these units and the processor may need access to a common resource such as memory. One way of arbitrating between multiple access requests for a common resource is timeslot arbitration, in which access to the resource is guaranteed to a particular requester during a predetermined timeslot.

One difficulty with this arrangement lies in the fact that not all access requests make the same demands on the resource in terms of timing and latency. For example, a memory read requires that data be fetched from memory, which may take a number of cycles, whereas a memory write can commence immediately. Timeslot arbitration does not take into account these differences, which may result in accesses being performed in a less efficient manner than might otherwise be the case. It would be desirable to provide a timeslot arbitration scheme that improved this efficiency as compared with prior art timeslot arbitration schemes.

Also of concern when allocating resources in a timeslot arbitration scheme is the fact that the priority of an access request may not be the same for all units. For example, it would be desirable to provide a timeslot arbitration scheme in which one requester (typically the memory) is granted special priority such that its requests are dealt with earlier than would be the case in the absence of such priority.

In systems that use a memory and cache, a cache miss (in which an attempt to load data or an instruction from a cache fails) results in a memory access followed by a cache update.

It is often desirable when updating the cache in this way to update data other than that which was actually missed. A typical example would be a cache miss for a byte resulting in an entire word or line of the cache associated with that byte being updated. However, this can have the effect of tying up bandwidth between the memory (or a memory manager) and the processor where the bandwidth is such that several cycles are required to transfer the entire word or line to the cache. It would be desirable to provide a mechanism for updating a cache that improved cache update speed and/or efficiency.

Most integrated circuits an externally provided signal as (or to generate) a clock, often provided from a dedicated clock generation circuit. This is often due to the difficulties of providing an onboard clock that can operate at a speed that is predictable. Manufacturing tolerances of such on-board clock generation circuitry can result in clock rates that vary by a factor of two, and operating temperatures can increase this margin by an additional factor of two. In some cases, the particular rate at which the clock operates is not of particular concern. However, where the integrated circuit will be writing to an internal circuit that is sensitive to the time over which a signal is provided, it may be undesirable to have the signal be applied for too long or short a time. For example, flash memory is sensitive to being written too for too long a period. It would be desirable to provide a mechanism for adjusting a rate of an on-chip system clock to take into account the impact of manufacturing variations on clockspeed.

One form of attacking a secure chip is to induce (usually by increasing) a clock speed that takes the logic outside its rated operating frequency. One way of doing this is to reduce the temperature of the integrated circuit, which can cause the clock to race. Above a certain frequency, some logic will start malfunctioning. In some cases, the malfunction can be such that information on the chip that would otherwise be secure may become available to an external connection. It would be desirable to protect an integrated circuit from such attacks.

In an integrated circuit comprising non-volatile memory, a power failure can result in unintentional behaviour. For example, if an address or data becomes unreliable due to falling voltage supplied to the circuit but there is still sufficient power to cause a write, incorrect data can be written. Even worse, the data (incorrect or not) could be written to the wrong memory. The problem is exacerbated with multi-word writes. It would be desirable to provide a mechanism for reducing or preventing spurious writes when power to an integrated circuit is failing.

In an integrated circuit, it is often desirable to reduce unauthorised access to the contents of memory. This is particularly the case where the memory includes a key or some other form of security information that allows the integrated circuit to communicate with another entity (such as another integrated circuit, for example) in a secure manner. It would be particularly advantageous to prevent attacks involving direct probing of memory addresses by physically investigating the chip (as distinct from electronic or logical attacks via manipulation of signals and power supplied to the integrated circuit).

It is also desirable to provide an environment where the manufacturer of the integrated circuit (or some other authorised entity) can verify or authorize code to be run on an integrated circuit. Another desideratum would be the ability of two or more entities, such as integrated circuits, to communicate with each other in a secure manner. It would also be desirable to provide a mechanism for secure communication between a first entity and a second entity, where the two entities, whilst capable of some form of secure communication, are not able to establish such communication between themselves.

In a system that uses resources (such as a printer, which uses inks) it may be desirable to monitor and update a record related to resource usage. Authenticating ink quality can be a major issue, since the attributes of inks used by a given printhead can be quite specific. Use of incorrect ink can result in anything from misfiring or poor performance to damage or destruction of the printhead. It would therefore be desirable to provide a system that enables authentication of the correct ink being used, as well as providing various support systems secure enabling refilling of ink cartridges.

In a system that prevents unauthorized programs from being loaded onto or run on an integrated circuit, it can be laborious to allow developers of software to access the circuits during software development. Enabling access to integrated circuits of a particular type requires authenticating software with a relatively high-level key. Distributing the key for use by developers is inherently unsafe, since a single leak of the key outside the organization could endanger security of all chips that use a related key to authorize programs. Having a small number of people with high-security clearance available to authenticate programs for testing can be inconvenient, particularly in the case where frequent incremental changes in programs during development require testing. It would be desirable to provide a mechanism for allowing access to one or more integrated circuits without risking the security of other integrated circuits in a series of such integrated circuits.

In symmetric key security, a message, denoted by M, is plaintext. The process of transforming M into ciphertext C, where the substance of M is hidden, is called encryption. The process of transforming C back into M is called decryption. Referring to the encryption function as E, and the decryption function as D, we have the following identities:

$$E[M]=C$$

$$D[C]=M$$

Therefore the following identity is true:

$$D[E[M]]=M$$

A symmetric encryption algorithm is one where:
the encryption function E relies on key $K_1$,
the decryption function D relies on key $K_2$,
$K_2$ can be derived from $K_1$, and
$K_1$ can be derived from $K_2$.

In most symmetric algorithms, $K_1$ equals $K_2$. However, even if $K_1$ does not equal $K_2$, given that one key can be derived from the other, a single key K can suffice for the mathematical definition.

Thus:

$$E_K[M]=C$$

$$D_K[C]=M$$

The security of these algorithms rests very much in the key K. Knowledge of K allows anyone to encrypt or decrypt. Consequently K must remain a secret for the duration of the value of M. For example, M may be a wartime message "My current position is grid position 123-456". Once the war is over the value of M is greatly reduced, and if K is made public, the knowledge of the combat unit's position may be of no relevance whatsoever. The security of the particular symmetric algorithm is a function of two things: the strength of the algorithm and the length of the key.

An asymmetric encryption algorithm is one where:
the encryption function E relies on key $K_1$,
the decryption function D relies on key $K_2$, $K_2$ cannot be derived from $K_1$ in a reasonable amount of time, and $K_1$ cannot be derived from $K_2$ in a reasonable amount of time.

Thus:

$$E_{K1}[M]=C$$

$$D_{K2}[C]=M$$

These algorithms are also called public-key because one key $K_1$ can be made public. Thus anyone can encrypt a message (using $K_1$) but only the person with the corresponding decryption key ($K_2$) can decrypt and thus read the message.

In most cases, the following identity also holds:

$$E_{K2}[M]=C$$

$$D_{K1}[C]=M$$

This identity is very important because it implies that anyone with the public key $K_1$ can see M and know that it came from the owner of $K_2$. No-one else could have generated C because to do so would imply knowledge of $K_2$. This gives rise to a different application, unrelated to encryption—digital signatures.

A number of public key cryptographic algorithms exist. Most are impractical to implement, and many generate a very large C for a given M or require enormous keys. Still others, while secure, are far too slow to be practical for several years. Because of this, many public key systems are hybrid—a public key mechanism is used to transmit a symmetric session key, and then the session key is used for the actual messages.

All of the algorithms have a problem in terms of key selection. A random number is simply not secure enough. The two large primes p and q must be chosen carefully—there are certain weak combinations that can be factored more easily (some of the weak keys can be tested for). But nonetheless, key selection is not a simple matter of randomly selecting 1024 bits for example. Consequently the key selection process must also be secure.

Symmetric and asymmetric schemes both suffer from a difficulty in allowing establishment of multiple relationships between one entity and a two or more others, without the need to provide multiple sets of keys. For example, if a main entity wants to establish secure communications with two or more additional entities, it will need to maintain a different key for each of the additional entities. For practical reasons, it is desirable to avoid generating and storing large numbers of keys. To reduce key numbers, two or more of the entities may use the same key to communicate with the main entity. However, this means that the main entity cannot be sure which of the entities it is communicating with. Similarly, messages from the main entity to one of the entities can be decrypted by any of the other entities with the same key. It would be desirable if a mechanism could be provided to allow secure communication between a main entity and one or more other entities that overcomes at least some of the shortcomings of prior art.

In a system where a first entity is capable of secure communication of some form, it may be desirable to establish a relationship with another entity without providing the other entity with any information related the first entity's security features. Typically, the security features might include a key or a cryptographic function. It would be desirable to provide a mechanism for enabling secure communications between a first and second entity when they do not share the requisite secret function, key or other relationship to enable them to establish trust.

SUMMARY OF THE INVENTION

In accordance with the invention, there is provided an integrated circuit, comprising a processor, an onboard system clock for generating a clock signal, and clock trim circuitry, the integrated circuit being configured to:

(a) receive an external signal;

(b) determine either the number of cycles of the clock signal during a predetermined number of cycles of the external signal, or the number of cycles of the external signal during a predetermined number of cycles of the clock signal;

(c) store a trim value in the integrated circuit, the trim value having been determined on the basis of the determined number of cycles; and (d) use the trim value to control the internal clock frequency.

Preferably, the integrated circuit is configured to, between steps (b) and (c):

output the result of the determination of step (b); and receive the trim value from an external source.

Preferably, the integrated circuit includes non-volatile memory, and (c) includes storing the trim value in the memory. More preferably, the memory is flash RAM.

In a preferred form step (d) includes loading the trim value from the memory into a register and using the trim value in the register to control a frequency of the internal clock.

In a preferred form, the trim value is determined and stored permanently in the integrated circuit. More preferably, the circuit includes one or more fuses that are intentionally blown following step (c), thereby preventing the stored trim value from subsequently being changed.

In a preferred embodiment, the system clock further includes a voltage controlled oscillator (VCO), an output frequency of which is controlled by the trim value. More preferably, the integrated circuit further includes a digital to analog convertor configured to convert the trim value to a voltage and supply the voltage to an input of the VCO, thereby to control the output frequency of the VCO.

Preferably, the integrated circuit is configured to operate under conditions in which the signal for which the number of cycles is being determined is at a considerably higher frequency than the other signal.

More preferably, the integrated circuit is configured to operate when a ratio of the number of cycles determined in step (b) and the predetermined number of cycles is greater than about 2. It is particularly preferred that the ratio is greater than about 4.

Preferably, the integrated circuit is disposed in a package having an external pin for receiving the external signal. More preferably, the pin is a serial communication pin configurable for serial communication when the trim value is not being set.

Preferably, the trim value was also determined on the basis of a compensation factor that took into account a temperature of the integrated circuit when the number of cycles are being determined.

Preferably, the trim value received was determined by the external source, the external source having determined the trim value including a compensation factor based on a temperature of the integrated circuit when the number of cycles are being determined.

Preferably, the trim value is determined by performing a number of iterations of determining the number of cycles, and averaging the determined number.

BRIEF DESCRIPTION OF THE DRAWINGS

Preferred and other embodiments of the invention will now be described, by way of example only, with reference to the accompanying drawings, in which.

DETAILED DESCRIPTION OF PREFERRED AND OTHER EMBODIMENTS

Figure 1:
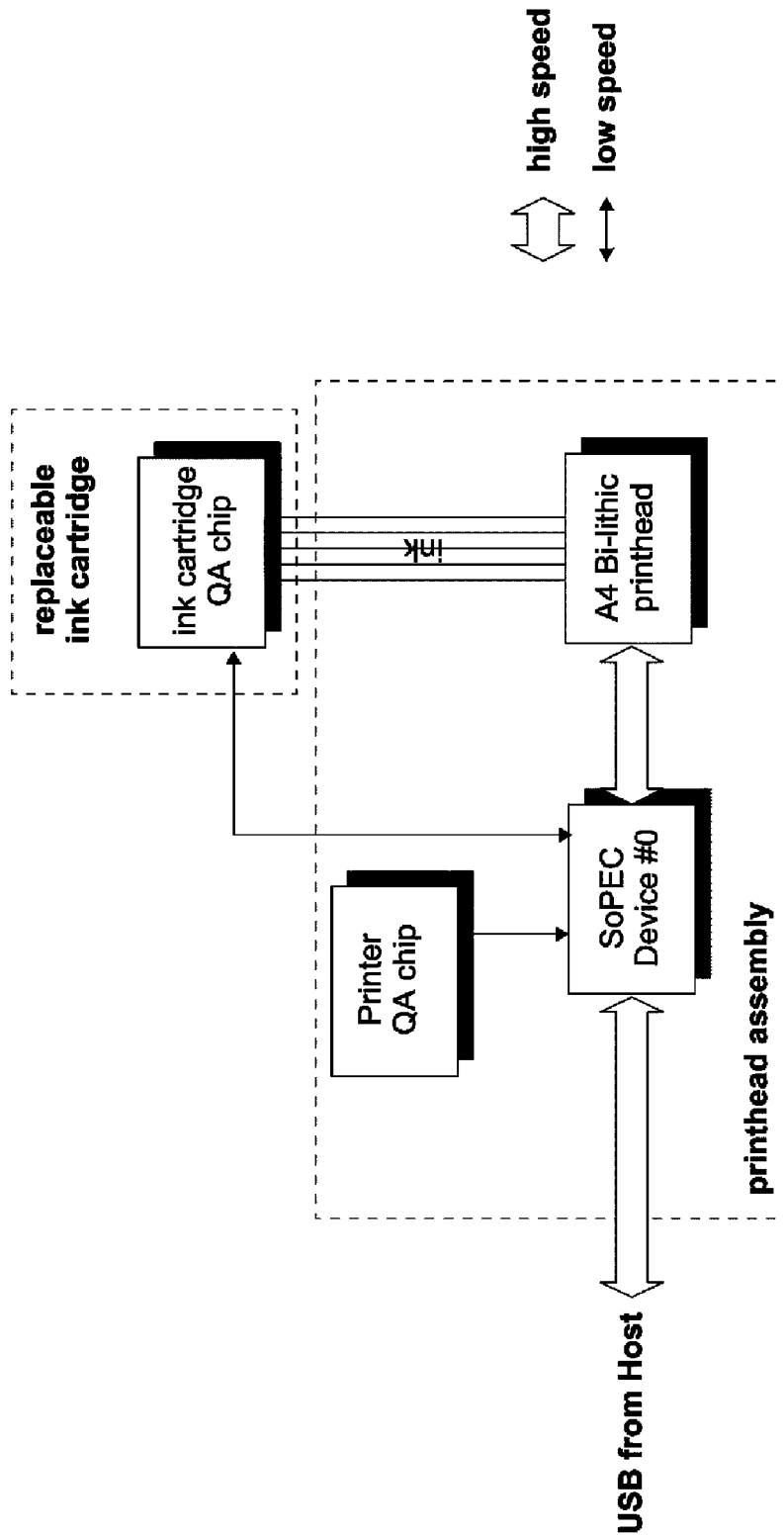
FIG. 1 is an example of a single printer controller (hereinafter "SoPEC") A4 simplex printer system

Imperative phrases such as "must", "requires", "necessary" and "important" (and similar language) should be read as being indicative of being necessary only for the preferred embodiment actually being described. As such, unless the opposite is clear from the context, imperative wording should not be interpreted as such. Nothing in the detailed description is to be understood as limiting the scope of the invention, which is intended to be defined as widely as is defined in the accompanying claims.

Indications of expected rates, frequencies, costs, and other quantitative values are exemplary and estimated only, and are made in good faith. Nothing in this specification should be read as implying that a particular commercial embodiment is or will be capable of a particular performance level in any measurable area.

The preferred embodiment of the present invention is implemented in a printer using microelectromechanical systems (MEMS) printheads. The printer can receive data from, for example, a personal computer such as an IBM compatible PC or Apple computer. In other embodiments, the printer can receive data directly from, for example, a digital still or video camera. The particular choice of communication link is not important, and can be based, for example, on USB, Firewire, Bluetooth or any other wireless or hardwired communications protocol.

A SoPEC (Small office home office Print Engine Controller) ASIC (Application Specific Integrated Circuit) is described which suitable for use in, for example, SoHo printer products. The SoPEC ASIC is intended to be a low cost solution for bi-lithic printhead control, replacing the multi-chip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design.

The following terms are used throughout this specification:

| | |
|---|---|
| Bi-lithic printhead | Refers to printhead constructed from 2 printhead ICs |
| CPU | Refers to CPU core, caching system and MMU. |
| ISI-Bridge chip | A device with a high speed interface (such as USB2.0, Ethernet or IEEE1394) and one or more ISI interfaces. The ISI-Bridge would be the ISIMaster for each of the ISI buses it interfaces to. |
| ISIMaster | The ISIMaster is the only device allowed to initiate communication on the Inter Sopec Interface (ISI) bus. The ISIMaster interfaces with the host. |
| ISISlave | Multi-SoPEC systems will contain one or more ISISlave SoPECs connected to the ISI bus. ISISlaves can only respond to communication initiated by the ISIMaster. |
| LEON | Refers to the LEON CPU core. |
| LineSyncMaster | The LineSyncMaster device generates the line synchronisation pulse that all SoPECs in the system must synchronise their line outputs to. |
| Multi-SoPEC | Refers to SoPEC based print system with multiple SoPEC devices |
| Netpage | Refers to page printed with tags (normally in infrared ink). |
| PEC1 | Refers to Print Engine Controller version 1, precursor to SoPEC used to control printheads constructed from multiple angled printhead segments. |
| Printhead IC | Single MEMS IC used to construct bi-lithic printhead |
| PrintMaster | The PrintMaster device is responsible for coordinating all aspects of the print operation. There may only be one PrintMaster in a system. |
| QA IC | Quality Assurance Integrated Circuit device/chip |
| Storage SoPEC | An ISISlave SoPEC used as a DRAM store and which does not print. |
| Tag | Refers to pattern which encodes information about its position and orientation which allow it to be optically located and its data contents read. |

A bi-lithic printhead produces 1600 dpi bi-level dots. On low-diffusion paper, each ejected drop forms a 22.5 m diameter dot. Dots are easily produced in isolation, allowing dispersed-dot dithering to be exploited to its fullest. Since the bi-lithic printhead is the width of the page and operates with a constant paper velocity, color planes are printed in perfect registration, allowing ideal dot-on-dot printing. Dot-on-dot printing minimizes 'muddying' of midtones caused by inter-color bleed.

A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16×16×8 bits for 257 intensity levels).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree [25][25]. At a normal viewing distance of 12 inches (about 300 mm), this translates roughly to 200-300 cycles per inch (cpi) on the printed page, or 400-600 samples per inch according to Nyquist's theorem.

In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not anti-aliased (i.e. low-pass filtered) before being printed. Text should therefore be supersampled beyond the perceptual limits discussed above, to produce smoother edges when spatially integrated by the eye. Text resolution up to about 1200 dpi continues to contribute to perceived text sharpness (assuming low-diffusion paper, of course).

A Netpage printer, for example, may use a contone resolution of 267 ppi (i.e. 1600 dpi 6), and a black text and graphics resolution of 800 dpi. A high end office or departmental printer may use a contone resolution of 320 ppi (1600 dpi/5) and a black text and graphics resolution of 1600 dpi. Both formats are capable of exceeding the quality of commercial (offset) printing and photographic reproduction.

The SoPEC device can be used in several printer configurations and architectures.

In the general sense every SoPEC based printer architecture will contain:
One or more SoPEC devices.
One or more bi-lithic printheads.
Two or more low speed serial interface (LSS) busses.
Two or more QA ICs.
USB 1.1 connection to host or ISI connection to Bridge Chip.
ISI bus connection between SoPECs (when multiple SoPECs are used).

The SoPEC device contains several system on a chip (SoC) components, as well as the print engine pipeline control application specific logic.

The PEP reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the bi-lithic printhead.

SoPEC contains an embedded CPU for general purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

A 2.5 Mbyte embedded memory buffer is integrated onto the SoPEC device, of which approximately 2 Mbytes are available for compressed page store data. A compressed page is divided into one or more bands, with a number of bands stored in memory. As a band of the page is consumed by the PEP for printing a new band can be downloaded. The new band may be for the current page or the next page.

Using banding it is possible to begin printing a page before the complete compressed page is downloaded, but care must be taken to ensure that data is always available for printing or a buffer underrun may occur.

An Storage SoPEC acting as a memory buffer or an ISI-Bridge chip with attached DRAM could be used to provide guaranteed data delivery.

The embedded USB 1.1 device accepts compressed page data and control commands from the host PC, and facilitates the data transfer to either embedded memory or to another SoPEC device in multi-SoPEC systems.

The printhead is constructed by abutting 2 printhead ICs together. The printhead ICs can vary in size from 2 inches to 8 inches, so to produce an A4 printhead several combinations are possible. For example two printhead ICs of 7 inches and 3 inches could be used to create a A4 printhead (the notation is 7:3). Similarly 6 and 4 combination (6:4), or 5:5 combination. For an A3 printhead it can be constructed from 8:6 or an 7:7 printhead IC combination. For photographic printing smaller printheads can be constructed.

Each SoPEC device has 2 LSS system buses for communication with QA devices for system authentication and ink usage accounting. The number of QA devices per bus and their position in the system is unrestricted with the exception that PRINTER_QA and INK_QA devices should be on separate LSS busses.

Each SoPEC system can have several QA devices. Normally each printing SoPEC will have an associated PRINTER_QA. Ink cartridges will contain an INK_QA IC. PRINTER_QA and INK_QA devices should be on separate LSS busses. All QA ICs in the system are physically identical with flash memory contents defining PRINTER_QA from INK_QA IC.

The Inter-SoPEC Interface (ISI) provides a communication channel between SoPECs in a multi-SoPEC system. The ISIMaster can be SoPEC device or an ISI-Bridge chip depending on the printer configuration. Both compressed data and control commands are transferred via the interface.

A device, other than a SoPEC with a USB connection, which provides print data to a number of slave SoPECs. A bridge chip will typically have a high bandwidth connection, such as USB 2.0, Ethernet or IEEE1394, to a host and may have an attached external DRAM for compressed page storage. A bridge chip would have one or more ISI interfaces. The use of multiple ISI buses would allow the construction of independent print systems within the one printer. The ISI-Bridge would be the ISIMaster for each of the ISI buses it interfaces to.

The Small Office Home Office Print Engine Controller (SoPEC) is a page rendering engine ASIC that takes compressed page images as input, and produces decompressed page images at up to 6 channels of bi-level dot data as output. The bi-level dot data is generated for the Memjet bi-lithic printhead. The dot generation process takes account of printhead construction, dead nozzles, and allows for fixative generation.

A single SoPEC can control 2 bi-lithic printheads and up to 6 color channels at 10,000 lines/sec, equating to 30 pages per minute at 1600 dpi. A single SoPEC can perform full-bleed printing of A3, A4 and Letter pages. The 6 channels of colored ink are the expected maximum in a consumer SOHO, or office Bi-lithic printing environment:

CMY, for regular color printing.

K, for black text, line graphics and gray-scale printing.

IR (infrared), for Netpage-enabled applications.

F (fixative), to enable printing at high speed. Because the bi-lithic printer is capable of printing so fast, a fixative may be required to enable the ink to dry before the page touches the page already printed. Otherwise the pages may bleed on each other. In low speed printing environments the fixative may not be required.

SoPEC is color space agnostic. Although it can accept contone data as CMYX or RGBX, where X is an optional 4th channel, it also can accept contone data in any print color space.

Additionally, SoPEC provides a mechanism for arbitrary mapping of input channels to output channels, including combining dots for ink optimization, generation of channels based on any number of other channels etc. However, inputs are typically CMYK for contone input, K for the bi-level input, and the optional Netpage tag dots are typically rendered to an infra-red layer. A fixative channel is typically generated for fast printing applications.

SoPEC is resolution agnostic. It merely provides a mapping between input resolutions and output resolutions by means of scale factors. The expected output resolution is 1600 dpi, but SoPEC actually has no knowledge of the physical resolution of the Bi-lithic printhead.

SoPEC is page-length agnostic. Successive pages are typically split into bands and downloaded into the page store as each band of information is consumed and becomes free.

SoPEC provides an interface for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

The required printing rate for SoPEC is 30 sheets per minute with an inter-sheet spacing of 4 cm. To achieve a 30 sheets per minute print rate, this requires:

300 mm×63 (dot/mm)/2 sec=105.8 seconds per line, with no inter-sheet gap.

340 mm×63 (dot/mm)/2 sec=93.3 seconds per line, with a 4 cm inter-sheet gap.

A printline for an A4 page consists of 13824 nozzles across the page [2]. At a system clock rate of 160 MHz 13824 dots of data can be generated in 86.4 seconds. Therefore data can be generated fast enough to meet the printing speed requirement. It is necessary to deliver this print data to the print-heads.

Printheads can be made up of 5:5, 6:4, 7:3 and 8:2 inch printhead combinations [2]. Print data is transferred to both print heads in a pair simultaneously. This means the longest time to print a line is determined by the time to transfer print data to the longest print segment. There are 9744 nozzles across a 7 inch printhead. The print data is transferred to the printhead at a rate of 106 MHz (⅔ of the system clock rate) per color plane. This means that it will take 91.9 s to transfer a single line for a 7:3 printhead configuration. So we can meet the requirement of 30 sheets per minute printing with a 4 cm gap with a 7:3 printhead combination. There are 11160 across an 8 inch printhead. To transfer the data to the printhead at 106 MHz will take 105.3 s. So an 8:2 printhead combination printing with an inter-sheet gap will print slower than 30 sheets per minute.

Figure 2:
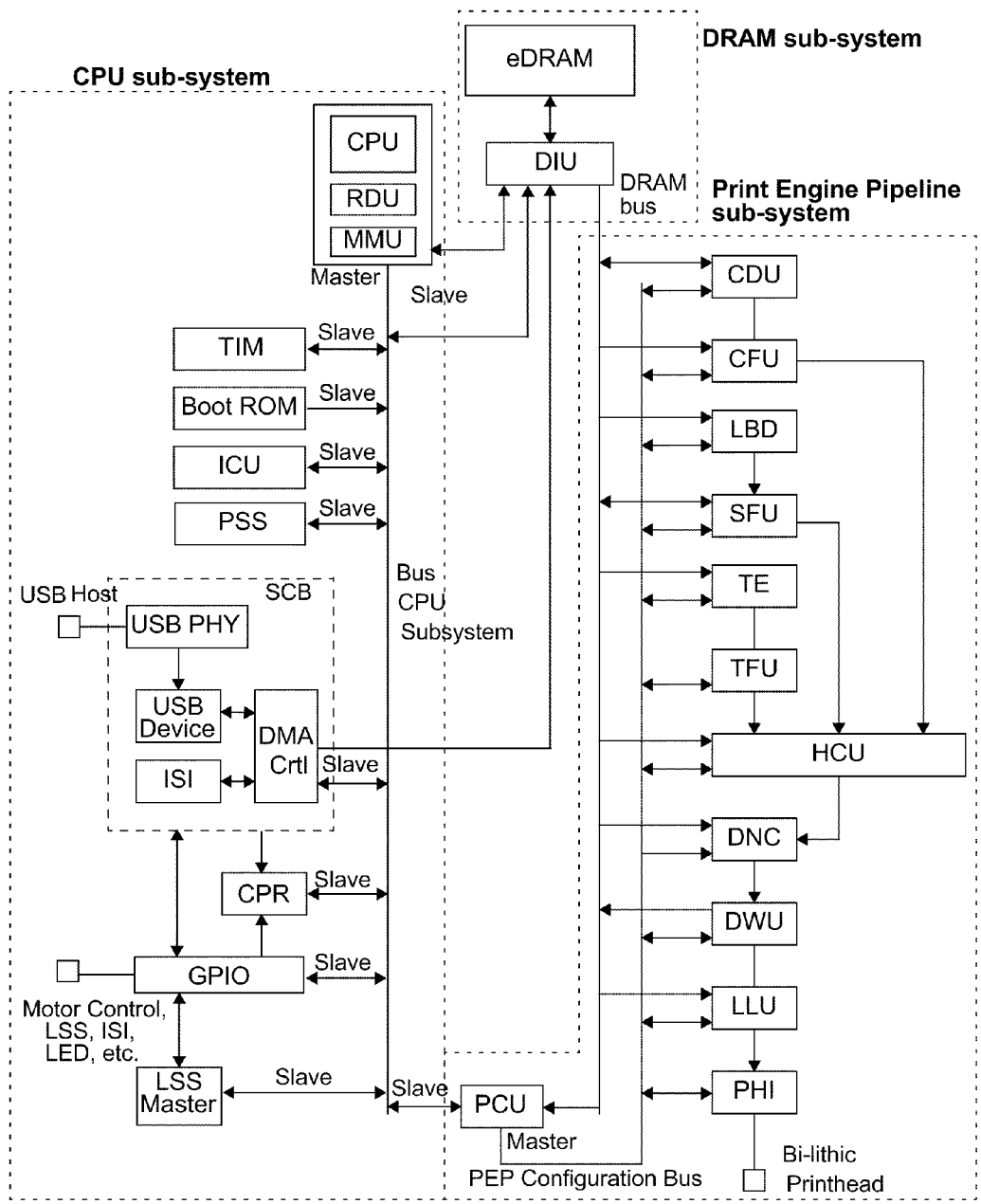
FIG. 2 shows a SoPEC system top level partition

Looking at FIG. 2, the various units are described here in summary form:

TABLE 1

Units within SoPEC

| Subsystem | Unit Acronym | Unit Name | Description |
|---|---|---|---|
| DRAM | DIU | DRAM interface unit | Provides the interface for DRAM read and write access for the various SoPEC units, CPU and the SCB block. The DIU provides arbitration between competing units controls DRAM access. |
|  | DRAM | Embedded DRAM | 20 Mbits of embedded DRAM, |
| CPU | CPU | Central Processing Unit | CPU for system configuration and control |
|  | MMU | Memory Management Unit | Limits access to certain memory address areas in CPU user mode |
|  | RDU | Real-time Debug Unit | Facilitates the observation of the contents of most of the CPU addressable registers in SoPEC in addition to some pseudo-registers in realtime. |
|  | TIM | General Timer | Contains watchdog and general system timers |
|  | LSS | Low Speed Serial Interfaces | Low level controller for interfacing with the QA ICs |

TABLE 1-continued

Units within SoPEC

| Subsystem | Unit Acronym | Unit Name | Description |
|---|---|---|---|
| | GPIO | General Purpose IOs | General IO controller, with built-in Motor control unit, LED pulse units and de-glitch circuitry |
| | ROM | Boot ROM | 16 KBytes of System Boot ROM code |
| | ICU | Interrupt Controller Unit | General Purpose interrupt controller with configurable priority, and masking. |
| | CPR | Clock, Power and Reset block | Central Unit for controlling and generating the system clocks and resets and powerdown mechanisms |
| | PSS | Power Save Storage | Storage retained while system is powered down |
| | USB | Universal Serial Bus Device | USB device controller for interfacing with the host USB. |
| | ISI | Inter-SoPEC Interface | ISI controller for data and control communication with other SoPEC's in a multi-SoPEC system |
| | SCB | Serial Communication Block | Contains both the USB and ISI blocks. |
| Print Engine Pipeline (PEP) | PCU | PEP controller | Provides external CPU with the means to read and write PEP Unit registers, and read and write DRAM in single 32-bit chunks. |
| | CDU | Contone decoder unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | TE | Tag encoder | Encodes tag data into line of tag dots. |
| | TFU | Tag FIFO Unit | Provides tag data storage between TE and HCU |
| | HCU | Halftoner compositor unit | Dithers contone layer and composites the bi-level spot 0 and position tag dots. |
| | DNC | Dead Nozzle Compensator | Compensates for dead nozzles by color redundancy and error diffusing dead nozzle data into surrounding dots. |
| | DWU | Dotline Writer Unit | Writes out the 6 channels of dot data for a given printline to the line store DRAM |
| | LLU | Line Loader Unit | Reads the expanded page image from line store, formatting the data appropriately for the bi-lithic printhead. |
| | PHI | PrintHead Interface | Is responsible for sending dot data to the bi-lithic printheads and for providing line synchronization between multiple SoPECs. Also provides test interface to printhead such as temperature monitoring and Dead Nozzle Identification. |

Communication between SoPEC and the QA ICs (i.e. INK_QA and PRINTER_QA) will take place on at least a per power cycle and per page basis. Communication with the QA ICs has three principal purposes: validating the presence of genuine QA ICs (i.e the printer is using approved consumables), validation of the amount of ink remaining in the cartridge and authenticating the operating parameters for the printer. After each page has been printed, SoPEC is expected to communicate the number of dots fired per ink plane to the QA chipset. SoPEC may also initiate decoy communications with the QA ICs from time to time.

Process:
When validating ink consumption SoPEC is expected to principally act as a conduit between the PRINTER_QA and INK_QA ICs and to take certain actions (basically enable or disable printing and report status to host PC) based on the result. The communication channels are insecure but all traffic is signed to guarantee authenticity.

Known Weaknesses

All communication to the QA ICs is over the LSS interfaces using a serial communication protocol. This is open to observation and so the communication protocol could be reverse engineered. In this case both the PRINTER_QA and INK_QA ICs could be replaced by impostor devices (e.g. a single FPGA) that successfully emulated the communication protocol. As this would require physical modification of each printer this is considered to be an acceptably low risk. Any messages that are not signed by one of the symmetric keys (such as the SoPEC_id_key) could be reverse engineered. The imposter device must also have access to the appropriate keys to crack the system.

If the secret keys in the QA ICs are exposed or cracked then the system, or parts of it, is compromised.

Assumptions:

[1] The QA ICs are not involved in the authentication of downloaded SoPEC code

[2] The QA IC in the ink cartridge (INK_QA) does not directly affect the operation of the cartridge in any way i.e. it does not inhibit the flow of ink etc.

[3] The INK_QA and PRINTER_QA ICs are identical in their virgin state. They only become a INK_QA or PRINTER_QA after their FlashROM has been programmed.

The authentication chip circuitry is designed to operate within a specific clock speed range. Since the user directly supplies the clock signal, it is possible for an attacker to attempt to introduce race-conditions in the circuitry at specific times during processing. An example of this is where a high clock speed (higher than the circuitry is designed for) may prevent an XOR from working properly, and of the two inputs, the first may always be returned. These styles of transient fault attacks can be very efficient at recovering secret key information. The lesson to be learned from this is that the input clock signal cannot be trusted.

Since the input clock signal cannot be trusted, it must be limited to operate up to a maximum frequency. This can be achieved a number of ways.

One way to filter the clock signal is to use an edge detect unit passing the edge on to a delay, which in turn enables the input clock signal to pass through.

Figure 3:
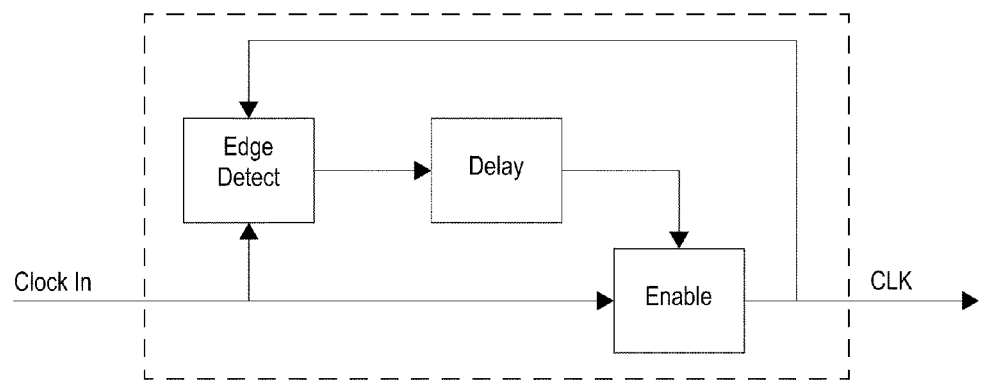
FIG. 3 shows clock filter
Figure 4:
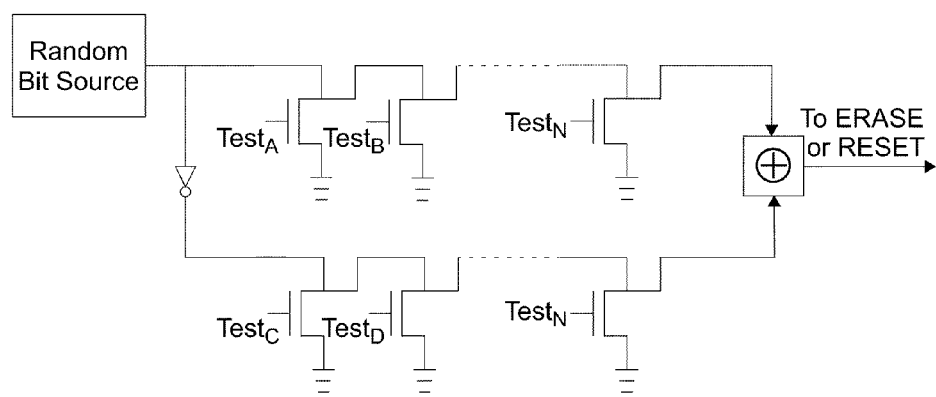
FIG. 4 shows tamper detection line
Figure 5:
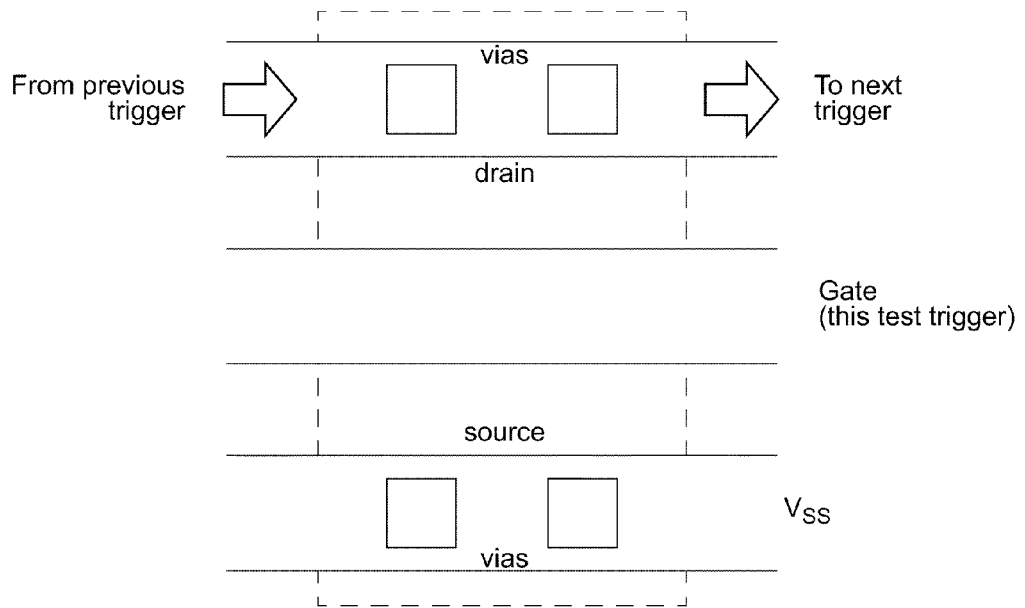
FIG. 5 shows an oversize nMOS transistor layout of Tamper Detection Line
Figure 6:
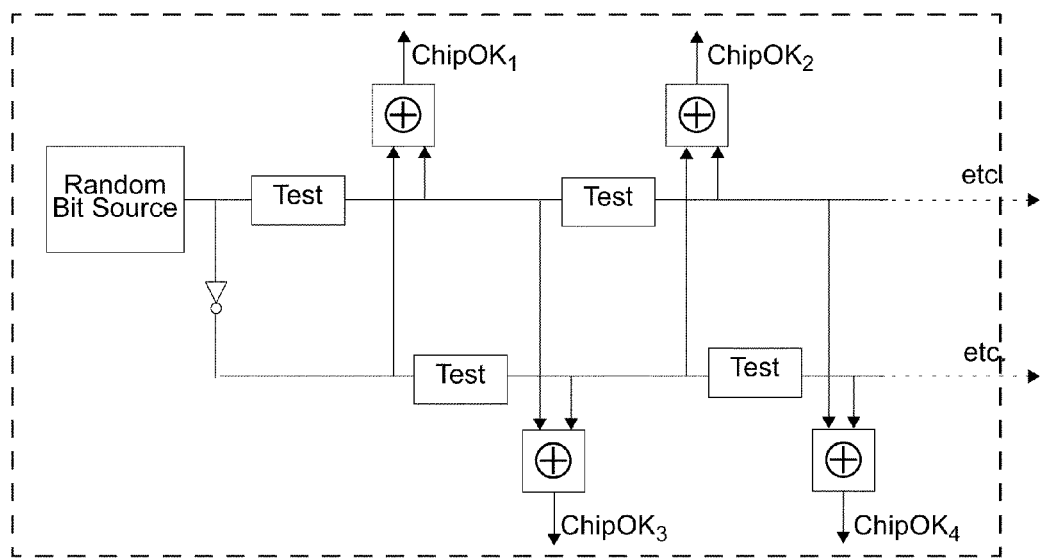
FIG. 6 shows a Tamper Detection Line
Figure 7:
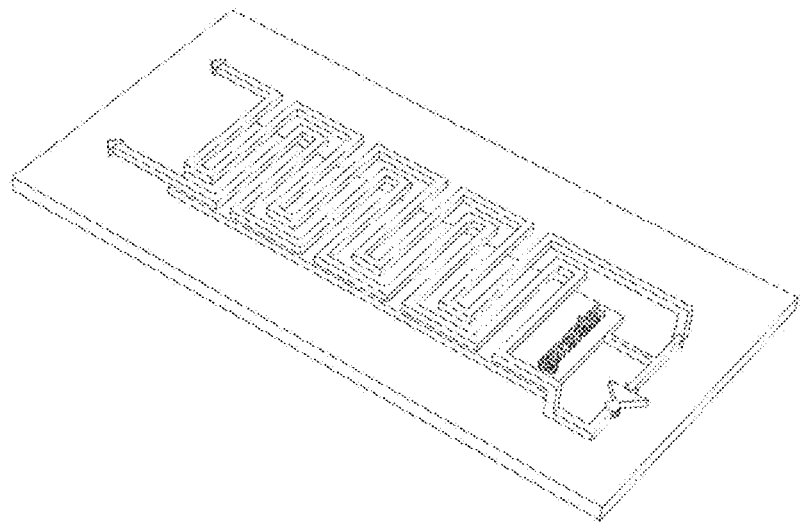
FIG. 7 shows how Tamper Detection Lines cover the Noise Generator

FIG. 3 shows clock signal flow within the Clock Filter.

The delay should be set so that the maximum clock speed is a particular frequency (e.g. about 4 MHz). Note that this delay is not programmable—it is fixed.

The filtered clock signal would be further divided internally as required.

The QA IC has a physical and a logical external interface. The physical interface defines how the QA IC can be connected to a physical System, while the logical interface determines how that System can communicate with the QA IC.

The QA IC has four operating modes—Idle Mode, Program Mode, Trim Mode and Active Mode.

Active Mode is entered on power-on Reset when the fuse has been blown, and whenever a specific authentication command arrives from the System. Program code is only executed in Active Mode. When the reset program code has finished, or the results of the command have been returned to the System, the chip enters Idle Mode to wait for the next instruction.

Idle Mode is used to allow the chip to wait for the next instruction from the System.

Trim Mode is used to determine the clock speed of the chip and to trim the frequency during the initial programming stage of the chip (when Flash memory is garbage). The clock frequency must be trimmed via Trim Mode before Program Mode is used to store the program code.

Program Mode is used to load up the operating program code, and is required because the operating program code is stored in Flash memory instead of ROM (for security reasons).

Apart from while the QA IC is executing Reset program code, it is always possible to interrupt the QA IC and change from one mode to another.

Active Mode is entered in any of the following three situations:

power-on Reset when the fuse has been blown receiving a command consisting of a global id write byte (0x00) followed by the ActiveMode command byte (0x06)

receiving a command consisting of a local id byte write followed by some number of bytes representing opcode and data.

In all cases, Active Mode causes execution of program code previously stored in the flash memory via Program Mode.

If Active Mode is entered by power-on Reset or the global id mechanism, the QA IC executes specific reset startup code, typically setting up the local id and other IO specific data. The reset startup code cannot be interrupted except by a power-down condition. The power-on reset startup mechanism cannot be used before the fuse has been blown since the QA IC cannot tell whether the flash memory is valid or not. In this case the globalid mechanism must be used instead.

If Active Mode is entered by the local id mechanism, the QA IC executes specific code depending on the following bytes, which function as opcode plus data. The interpretation of the following bytes depends on whatever software happens to be stored in the QA IC.

The QA IC starts up in Idle Mode when the fuse has not yet been blown, and returns to Idle Mode after the completion of another mode. When the QA IC is in Idle Mode, it waits for a command from the master by watching the low speed serial line for an id that matches either the global id (0x00), or the chip's local id.

If the primary id matches the global id (0x00, common to all QA ICs), and the following byte from the master is the Trim Mode id byte, and the fuse has not yet been blown, the QA IC enters Trim Mode and starts counting the number of internal clock cycles until the next byte is received. Trim Mode cannot be entered if the fuse has been blown.

If the primary id matches the global id (0x00, common to all QA ICs), and the following byte from the master is the Program Mode id byte, and the fuse has not yet been blown, the QA IC enters Program Mode. Program Mode cannot be entered if the fuse has been blown.

If the primary id matches the global id (0x00, common to all QA ICs), and the following byte from the master is the Active Mode id bytes, the QA IC enters Active Mode and executes startup code, allowing the chip to set itself into a state to subsequently receive authentication commands (includes setting a local id and a trim value).

If the primary id matches the chip's local id, the QA IC enters Active Mode, allowing the subsequent command to be executed.

The valid 8-bit serial mode values sent after a global id are as shown in Table 2:

TABLE 2

Command byte values to place chip in specific mode

| Value | Interpretation |
|---|---|
| 10101011 (0xAB) | Trim Mode (only functions when the fuse has not been blown) |
| 10001101 (0xAD) | Program Mode (only functions when the fuse has not been blown) |
| 00000110 (0x06) | Active Mode (resets the chip & loads the localId) |

Trim Mode is enabled by sending a global id byte (0x00) followed by the Trim Mode command byte (0xAB). Trim Mode can only be entered while the fuse has not yet been blown.

The purpose of Trim Mode is to set the trim value (an internal register setting) of the internal ring oscillator so that Flash erasures and writes are of the correct duration. This is necessary due to the 2:1 variation of the clock speed due to process variations. If writes an erasures are too long, the Flash memory will wear out faster than desired, and in some cases can even be damaged. Note that the 2:1 variation due to temperature still remains, so the effective operating speed of the chip is 7-14 MHz around a nominal 10 MHz.

Trim Mode works by measuring the number of system clock cycles that occur inside the chip from the receipt of the Trim Mode command byte until the receipt of a data byte. When the data byte is received, the data byte is copied to the trim register and the current value of the count is transmitted to the outside world.

Once the count has been transmitted, the QA IC returns to Idle Mode.

At reset, the internal trim register setting is set to a known value r. The external user can now perform the following operations:

send the global id+write followed by the Trim Mode command byte
send the 8-bit value v over a specified time t
send a stop bit to signify no more data
send the global id+read followed by the Trim Mode command byte
receive the count c
send a stop bit to signify no more data At the end of this procedure, the trim register will be v, and the external user will know the relationship between external time t and internal time c. Therefore a new value for v can be calculated.

The Trim Mode procedure can be repeated a number of times, varying both t and v in known ways, measuring the resultant c. At the end of the process, the final value for v is established (and stored in the trim register for subsequent use in Program Mode). This value v must also be written to the flash for later use (every time the chip is placed in Active Mode for the first time after power-up).

Program Mode is enabled by sending a global id byte (0x00) followed by the Program Mode command byte.

If the QA IC knows already that the fuse has been blown, it simply does not enter Program Mode. If the QA IC does not know the state of the fuse, it determines whether or not the internal fuse has been blown by reading 32-bit word 0 of the information block of flash memory. If the fuse has been blown the remainder of data from the Program Mode command is ignored, and the QA IC returns to Idle Mode.

If the fuse is still intact, the chip enters Program Mode and erases the entire contents of Flash memory. The QA IC then validates the erasure. If the erasure was successful, the QA IC receives up to 4096 bytes of data corresponding to the new program code and variable data. The bytes are transferred in order $byte_0$ to $byte_{4095}$.

Once all bytes of data have been loaded into Flash, the QA IC returns to Idle Mode.

Note that Trim Mode functionality must be performed before a chip enters Program Mode for the first time. Otherwise the erasure and write durations could be incorrect.

Once the desired number of bytes have been downloaded in Program Mode, the LSS Master must wait for 80 s (the time taken to write two bytes to flash at nybble rates) before sending the new transaction (e.g. Active Mode). Otherwise the last nybbles may not be written to flash. Directly after manufacture the flash memory will be invalid and the fuse will not have been blown. Therefore power-on-reset will not cause Active Mode. Trim Mode must therefore be entered first, and only after a suitable trim value is found, should Program Mode be entered to store a program. Active Mode can be entered if the program is known to be valid.

A number of registers are defined for use by the CPU. They are used for control, temporary storage, arithmetic functions, counting and indexing, and for I/O.

These registers do not need to be kept in non-volatile (Flash) memory. They can be read or written without the need for an erase cycle (unlike Flash memory). Temporary storage registers that contain secret information still need to be protected from physical attack by Tamper Prevention and Detection circuitry and parity checks.

All registers are cleared to 0 on a RESET. However, program code should not assume any RAM contents have any particular state, and should set up register values appropriately. In particular, at the startup entry point, the various address registers need to be set up from unknown states. The WriteMask register is used to determine how many nybbles will be written during a 32-bit write to Flash, and whether or not an invalid nybble will be replaced during a read from Flash. During writes to flash, bit n (of 8) determines whether nybble n is written. The unit of writing is a nybble since half of each byte is used for shadow data. A setting of 0xFF means that all 32-bits will be written to flash (as 8 sets of nybble writes).

During 32-bit reads from flash (occurs as 8 reads), the value of $WriteMask_0$ is used to determine whether a read of invalid data is replaced by the upper nybble of WriteMask. If 0, a read of invalid data is not replaced, and the chip hangs until a new command is issued over the serial interface. If 1, a read of invalid data is replaced by the upper nybble of the WriteMask. Thus a WriteMask setting of 0 (reset setting) means that no writes will occur to flash, and all reads are not replaced (causing the program to hang if an invalid value is encountered). Several registers are defined for communication between the master and the QA IC. These registers are LocalId, InByte and OutByte.

LocalId (7 bits) defines the chip-specific id that this particular QA IC will accept commands for. InByte (8 bits) provides the means for the QA IC to obtain the next byte from the master. OutByte (8 bits) provides the means for the QA IC to send a byte of data to the master.

From the QA IC's point of view:
Reads from InByte will hang until there is 1 byte of data present from the master.
Writes to OutByte will hang if the master has not already consumed the last OutByte.

When the master begins a new command transaction, any existing data in InByte and OutByte is lost, and the PC is reset to the entry point in the code, thus ensuring correct framing of data.

A single 8-bit Trim register is used to trim the ring oscillator clock speed. The register has a known value of 0x00 during reset to ensure that reads from flash will succeed at the fastest process corners, and can be set in one of two ways:

via Trim Mode, which is necessary before the QA IC is programmed for the first time; or
via the CPU, which is necessary every time the QA IC is powered up before any flash write or erasure accesses can be carried out.

Whenever the chip is powered up, or receives a 'write' command over the serial interface, the PC and PCRamSel get set to 0 and execution begins at 0 in Flash memory. The program (starting at 0) needs to determine how the program was started by reading the InByte register. If the first byte read is 0xFF, the chip is being requested to perform software reset tasks. Execution of software reset can only be interrupted by a power down. The reset tasks include setting up RAM to contain known startup state information, setting up Trim and localID registers etc. The CPU signals that it is now ready to receive commands from an external device by writing to the OutByte register. An external Master is able to read the Out-Byte (and any further outbytes that the CPU decides to send) if it so wishes by a read using the localId. Otherwise the first byte read will be of the form where the least significant bit is 0, and bits 7-1 contain the localId of the device as read over the serial interface. This byte is usually discarded since it nominally only has a value of differentiation against a software reset request. The second and subsequent bytes contain the data message of a write using the localId. The CPU can prevent interruption during execution by writing 0 to the localId and then restoring the desired localId at the later stage.

The CPU operates on 8-bit instructions and typically on 32-bit data items. Each instruction typically consists of an opcode and operand, although the number of bits allocated to opcode and operand varies between instructions. The opcodes are summarized in Table 3:

TABLE 3

Opcode bit pattern map

| Opcode | Mnemonic | Simple Description |
| --- | --- | --- |
| 0000xxxx | JMP | Jump |
| 0001xxxx | JSR | Jump subroutine |
| 0010xxxx | TBR | Test and branch |
| 0011xxxx | DBR | Decrement and branch |
| 0100xxxx | SC | Set counter to a value |
| 0101xxxx | ST | Store Accumulator in specified location |
| 0110000x | — | reserved |
| 01100010 | JPZ | Jump to 0 |
| 01100011 | JPI | Jump indirect |
| 011001xx | — | reserved |
| 01101xxx | — | reserved |
| 01110000 | — | reserved |
| 01110001 | ERA | Erase page of flash memory pointed to by Accumulator |
| 01110010 | JSZ | Jump to subroutine at at 0 |
| 01110011 | JSI | Jump subroutine indirect |
| 01110100 | RTS | Return from subroutine |
| 01110101 | HALT | Stop the CPU |
| 0111011x | — | reserved |
| 01111xxx | LIA | Load immediate value into address register |
| 10000xxx | AND | Bitwise AND Accumulator |
| 10001xxx | OR | Bitwise OR Accumulator |
| 1001xxxx | XOR | Exclusive-OR Accumulator |
| 1010xxxx | ADD | Add a 32 bit value to the Accumulator |
| 1011xxxx | LD | Load Accumulator |
| 1100xxxx | ROR | Rotate Accumulator right |
| 11010xxx | AND | Bitwise AND Accumulator[1] |
| 11011xxx | OR | Bitwise OR Accumulator[1] |
| 11100xxx | XOR | Bitwise XOR Accumulator[1] |
| 11101xxx | ADD | Add a 32 bit value to the Accumulator[1] |
| 11110xxx | LD | Load Accumulator[1] |
| 11111xxx | RIA | Rotate Accumulator into address register |

[1]immediate form of instruction

Table 4 is a summary of valid operands for each opcode. The table is ordered alphabetically by opcode mnemonic.

TABLE 4

Valid operands for opcodes

| Opcode | Valid operands |
| --- | --- |
| ADD | immediate value |
|  | (A0), offset |
|  | (An), {C1, C2} [where n = 0-3] |

TABLE 4-continued

Valid operands for opcodes

| Opcode | Valid operands |
| --- | --- |
| AND | immediate value |
|  | (A0), offset |
| DBR | {C1, C2}, offset |
| ERA |  |
| HALT |  |
| JMP | address |
| JPI |  |
| JPZ |  |
| JSI |  |
| JSR | address |
| JSZ |  |
| LIA | {Flash, Ram}, An [where n = 0-3], {immediate value} |
| LD | immediate value |
|  | (A0), offset |
|  | (An), {C1, C2} [where n = 0-3] |
| OR | immediate value |
|  | (A0), offset |
| RIA | {Flash, Ram}, An [where n = 0-3] |
| ROR | {InByte, OutByte, WriteMask, ID, C1, C2, RB, XRB, 1, 3, 8, 24, 31} |
| RTS |  |
| SC | {C1, C2}, {immediate value} |
| ST | (A0), offset |
|  | (An), {C1, C2} [where n = 0-3] |
| TBR | {0, 1}, offset |
| XOR | immediate value |
|  | (A0), offset |
|  | (An), {C1, C2} [where n = 0-3] |

Additional pseduo-opcodes (for programming convenience) are as follows:
DEC=ADD 0xFF.
INC=ADD 0x01
NOT=XOR 0xFF.
LDZ=LD 0
SC {C1, C2}, Acc=ROR {C1, C2}
RD=ROR Inbyte
WR=ROR OutByte
LDMASK=ROR WriteMask
LDID=ROR Id
NOP=XOR 0
The CPU supports a set of addressing modes as follows:
immediate
accumulator indirect
indirect fixed
indirect indexed In the immediate form of addressing, the operand itself supplies the 32-bit data. Immediate addressing relies on 3 bits of operand, plus an optional 8 bits at PC+1 to determine an 8-bit base value. Bits 0 to 1 of the opcode byte determine whether the base value comes from the opcode byte itself, or from PC+1, as shown in Table 5.

TABLE 5

Selection for base value in immediate mode

| Opcode$_{1-0}$ | Base value |
| --- | --- |
| 00 | 00000000 |
| 01 | 00000001 |
| 10 | From PC + 1 (i.e. MIUData$_{7-0}$) |
| 11 | 11111111 |

The base value is computed by using $CMD_0$ as bit 0, and copying $CMD_1$ into the upper 7 bits. The resultant 8 bit base value is then used as a 32-bit value, with 0s in the upper 24 bits, or the 8-bit value is replicated into the upper 32 bits. The selection is determined by bit 2 of the opcode byte, as follows:

TABLE 6

Replicate bits selection

| Opcode$_2$ | Data |
|---|---|
| 0 | No replication. Data has 0 in upper 24 bits and base Val in lower 8 bits |
| 1 | Replicated. Data is 32-bit value formed by replicating baseVal. |

Opcodes that support immediate addressing are LD, ADD, XOR, AND, OR. The SC and LIA instructions are also immediate in that they store the data with the opcode, but they are not in the same form as that described here. See the detail on the individual instructions for more information.

Single byte examples include:
LD 0
ADD 1
ADD 0xFF . . . # this subtracts 1 from the acc
XOR 0xFF . . . # this performs an effective logical NOT operation
Double byte examples include:
LD 0x05 # a constant
AND 0x0F # isolates the lower nybble
LD 0x36 . . . # useful for HMAC processing In Accumulator indirect form of addressing, the Accumulator holds the effective address. Opcodes that support Accumulator indirect addressing are JPI, JSI and ERA. In the case of JPI and JSI, the Accumulator holds the address to jump to. In the case of ERA, the Accumulator holds the address of the page in flash memory to be erased.

Examples include:
JPI
JSI
ERA

In indirect fixed form of addressing, address register A0 is used as a base address, and then a specific fixed offset is added to the base address to give the effective address.

Bits 2-0 of the opcode byte specify the fixed offset from A0, which means the fixed offset has a range of 0 to 7.

Opcodes that support indirect indexed addressing are LD, ST, ADD, XOR, AND, OR.

Examples include:
LD (A0), 2
ADD (A0), 3
AND (A0), 4
ST (A0), 7

In indirect indexed form of addressing, an address register is used as a base address, and then an index register is used to offset from that base address to give the effective address.

The address register is one of 4, and is selected via bits 2-1 of the opcode byte as follows:

TABLE 7

Address register selection

| Opcode$_{2-1}$ | address register selected |
|---|---|
| 00 | A0 |
| 01 | A1 |
| 10 | A2 |
| 11 | A3 |

Bit 0 of the opcode byte selects whether index register C1 or C2 is used:

The counter is selected as follows:

TABLE 8

Interpretation of counter for DBR

| Opcode$_0$ | interpretion |
|---|---|
| 0 | C1 |
| 1 | C2 |

Opcodes that support indirect indexed addressing are LD, ST, ADD, XOR.

Examples include:
LD (A2), C1
ADD (A1), C1
ST (A3), C2

Since C1 and C2 can only decement, processing of data structures typically works by loading Cn with some number n and decrementing to 0. Thus (Ax),n is the first word accessed, and (Ax),0 is the last 32-bit word accessed in the loop.

The ROR instruction provides a way of rotating the Accumulator right a set number of bits. The bit(s) coming in at the top of the Accumulator (to become bit 31) can either come from the previous lower bits of the Accumulator, from the serial connection, or from external flags. The bit(s) rotated out can also be output from the serial connection, or combined with an external flag.

The allowed operands are as follows:

TABLE 9

Interpretation of operand for ROR

| bits 3-0 | interpretion |
|---|---|
| 0000 | RB |
| 0001 | XRB |
| 0010 | WriteMask |
| 0011 | 1 |
| 0100 | — (reserved) |
| 0101 | 3 |
| 0110 | 31 |
| 0111 | 24 |
| 1000 | C1 |
| 1001 | C2 |
| 1010 | — (reserved) |
| 1011 | — (reserved) |
| 1100 | 8 |
| 1101 | ID |
| 1110 | InByte |
| 1111 | OutByte |

The Z flag is also set during this operation, depending on whether resultant 32-bit value (loaded into the Accumulator) is zero or not.

In its simplest form, the operand for the ROR instruction is one of 1, 3, 8, 24, 31, indicating how many bit positions the Accumulator should be rotated. For these operands, there is no external input or output—the bits of the Accumulator are merely rotated right. Note that these values are the equivalent to rotating left 31, 29, 24, 8, 1 bit positions. With operand WriteMask, the lower 8 bits of the Accumulator are transferred to the WriteMask register, and the Accumulator is rotated right by 1 bit. This conveniently allows successive nybbles to be masked during Flash writes if the Accumulator has been preloaded with an appropriate value (eg 0x01).

With operands C1 and C2, the lower appropriate number of bits of the Accumulator (3 for C1, 6 for C2) are transferred to the C1 or C2 register and the lower 6 bits of the Accumulator are loaded with the previous value of the Cn register. The remaining upper bits of the Accumulator are set as follows: bit 31-24 are copied from previous bits 7-0, and bits 23-6 are copied from previous bits 31-14 (effectively junk). As a result, the Accumulator should be subsequently masked if the programmer wants to compare for specific values).

With operand ID, the 7 low-order bits are transferred from the Accumulator to the LocalId register, the low-order 8 bits of the Accumulator are copied to the Trim register if the Trim register has not already been written to after power-on reset, and the Accumulator is rotated right by 8 bits. This means that the ROR ID instruction needs to be performed twice, typically during Global Active Mode—once to set Trim, and once to set LocalId. Note there is no way to read the contents of the localId or Trim registers directly. However the LocalId sent to the program for a command is available as bits 7-1 of the first byte obtained from InByte after program startup. With operand InByte, the next serial input byte is transferred to the highest 8 bits of the Accumulator. The InByteValid bit is also cleared. If there is no input byte available from the client yet, execution is suspended until there is one. The remainder of the Accumulator is shifted right 8 bit positions (bit 31 becomes bit 23 etc.), with lowest bits of the Accumulator shifted out. With operand OutByte, the Accumulator is shifted right 8 bit positions. The byte shifted out from bits 7-0 is stored in the OutByte register and the OutByteValid flag is set. It is therefore ready for a client to read. If the OutByteValid flag is already set, execution of the instruction stalls until the OutByteValid flag cleared (when the OutByte byte has been read by the client). The new data shifted in to the upper 8 bits of the Accumulator is what was transferred to the OutByte register (i.e. from the Accumulator).

Finally, the RB and XRB operands allow the implementation of LFSRs and multiple precision shift registers. With RB, the bit shifted out (formally bit 0) is written to the RTMP register. The register currently in the RTMP register becomes the new bit 31 of the Accumulator. Performing multiple ROR RB commands over several 32-bit values implements a multiple precision rotate/shift right. The XRB operates in the same way as RB, in that the current value in the RTMP register becomes the new bit 31 of the Accumulator. However with the XRB instruction, the bit formally known as bit 0 does not simply replace RTMP (as in the RB instruction).

Instead, it is XORed with RTMP, and the result stored in RTMP. This allows the implementation of long LFSRs, as required by the authentication protocol.

The pin connections od the QA IC are described in Table 10.

TABLE 10

Pin connections to QA IC

| pin | direction | description |
| --- | --- | --- |
| Vdd | In | Nominal voltage. If the voltage deviates from this by more than a fixed amount, the chip will RESET. |
| GND | In | |
| SClk | In | Serial clock |
| SDa | In/Out | Serial data |

The system operating clock SysClk is different to SClk. SysClk is derived from an internal ring oscillator based on the process technology. In the FPGA implementation SysClk is obtained via a 5th pin.

The QA IC uses a 0.25 m CMOS Flash process for an area of 1 $mm^2$ yielding a 10 cent manufacturing cost in 2002. A breakdown of area is listed in Table 11.

TABLE 11

Breakdown of Area for QA IC

| approximate area ($mm^2$) | description |
| --- | --- |
| 0.49 | 8 KByte flash memory TSMC: SFC0008_08B9_HE (8K × 8-bits, erase page size = 512 bytes) Area = 724.688 m × 682.05 m. |
| 0.08 | 3072 bits of static RAM |
| 0.38 | General logic |
| 0.05 | Analog circuitry |
| 1 | TOTAL (approximate) |

Note that there is no specific test circuitry (scan chains or BIST) within the QA IC, so the total transistor count is as shown in Table 11.

The chip performs a RESET upon power-up. In addition, tamper detection and prevention circuitry in the chip will cause the chip to either RESET or erase Flash memory (depending on the attack detected) if an attack is detected.

The base operating system clock SysClk is generated internally from a ring oscillator (process dependant). Since the frequency varies with operating temperature and voltage, the clock is passed through a temperature-based clock filter before use. The frequency is built into the chip during manufacture, and cannot be changed. The frequency is in the range 7-14 MHz.

Manufacturing comments are not normally made when normally describing the architecture of a chip. However, in the case of the QA IC, the physical implementation of the chip is very much tied to the security of the key. Consequently a number of specialized circuits and components are necessary for implementation of the QA IC. They are listed here.

Flash process
Internal randomized clock
Temperature based clock filter
Noise generator
Tamper Prevention and Detection circuitry
Protected memory with tamper detection
Boot-strap circuitry for loading program code
Data connections in polysilicon layers where possible
OverUnderPower Detection Unit
No scan-chains or BIST The QA IC is implemented with a standard Flash manufacturing process. It is important that a Flash process be used to ensure that good endurance is achieved (parts of the Flash memory can be erased/written many times).

To prevent clock glitching and external clock-based attacks, the operating clock of the chip should be generated internally. This can be conveniently accomplished by an internal ring oscillator. The length of the ring depends on the process used for manufacturing the chip.

Due to process and temperature variations, the clock needs to be trimmed to bring it into a range usable for timing of Flash memory writes and erases.

The internal clock should also contain a small amount of randomization to prevent attacks where light emissions from switching events are captured, as described below.

Finally, the generated clock must be passed through a temperature-based clock filter before being used by the rest of the chip.

Figure 8:
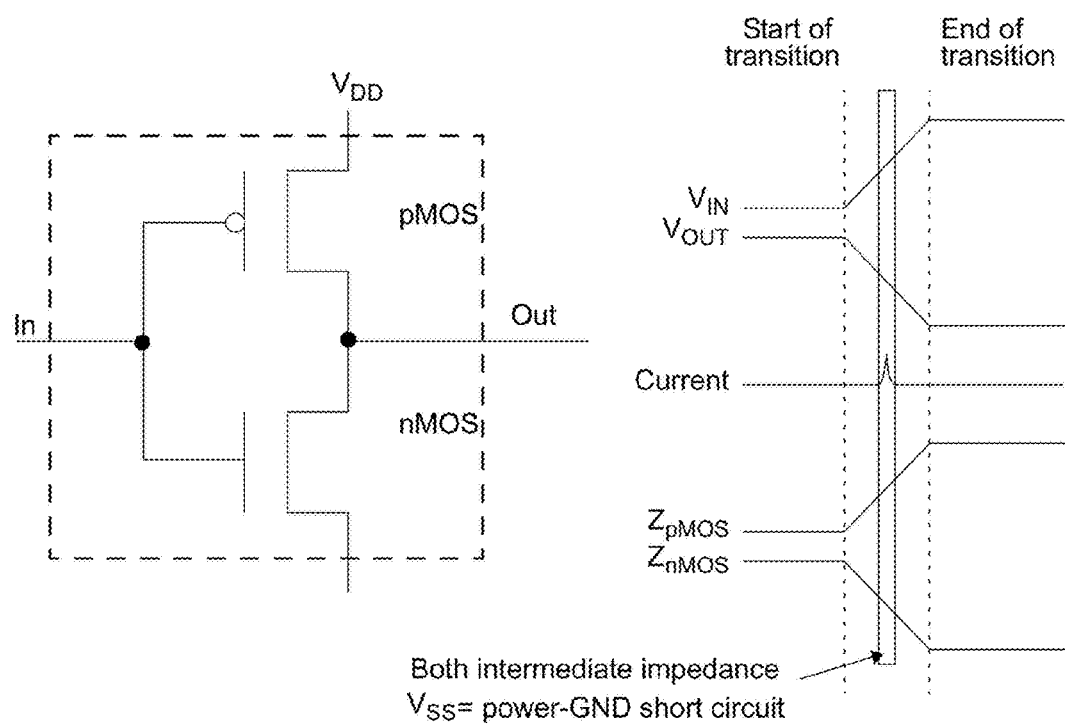
FIG. 8 shows a prior art FET Implementation of CMOS inverter

The normal situation for FET implementation for the case of a CMOS inverter (which involves a pMOS transistor combined with an nMOS transistor) as shown in FIG. 8.

During the transition, there is a small period of time where both the nMOS transistor and the pMOS transistor have an intermediate resistance. The resultant power-ground short circuit causes a temporary increase in the current, and in fact accounts for around 20% of current consumed by a CMOS device. A small amount of infrared light is emitted during the short circuit, and can be viewed through the silicon substrate (silicon is transparent to infrared light). A small amount of light is also emitted during the charging and discharging of the transistor gate capacitance and transmission line capacitance.

For circuitry that manipulates secret key information, such information must be kept hidden. Fortunately, IBM's PICA system and LVP (laser voltage probe) both have a requirement for repeatability due to the fact that the photo emissions are extremely weak (one photon requires more than $10^5$ switching events). PICA requires around $10^9$ passes to build a picture of the optical waveform. Similarly the LVP requires multiple passes to ensure an adequate SNR. Randomizing the clock stops repeatability (from the point of view of collecting information about the same position in time), and therefore reduces the possibility of this attack.

The QA IC circuitry is designed to operate within a specific clock speed range. Although the clock is generated by an internal ring oscillator, the speed varies with temperature and power. Since the user supplies the temperature and power, it is possible for an attacker to attempt to introduce race-conditions in the circuitry at specific times during processing. An example of this is where a low temperature causes a clock speed higher than the circuitry is designed for, and this may prevent an XOR from working properly, and of the two inputs, the first may always be returned. The lesson to be learned from this is that the input power and operating temperature cannot be trusted.

Since the chip contains a specific power filter, we must also filter the clock. This can be achieved with a temperature sensor that allows the clock pulses through only when the temperature range is such that the chip can function correctly.

The filtered clock signal would be further divided internally as required.

Figure 9:
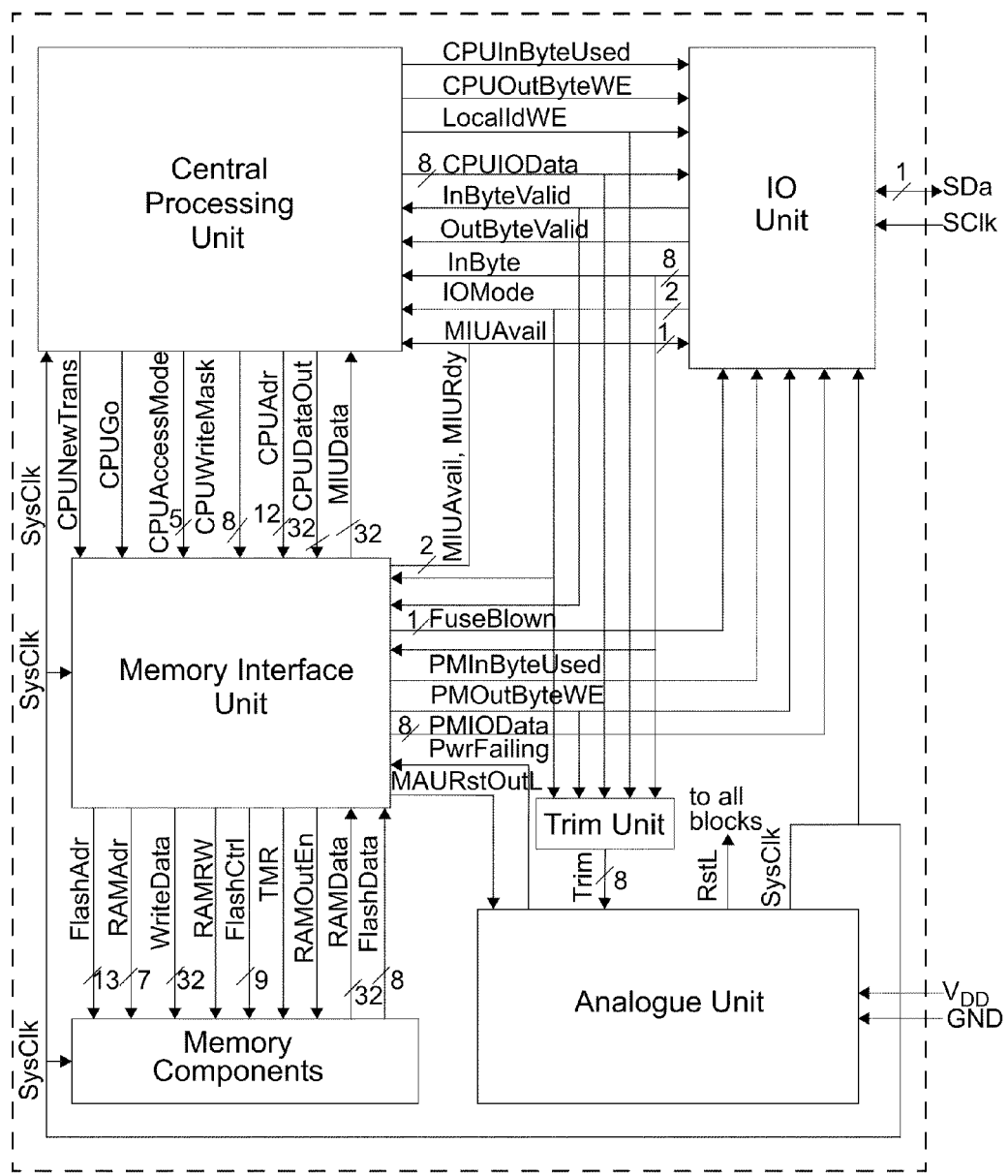
FIG. 9 shows a high level block diagram of QA Chip

FIG. 9 shows a high level block diagram of the QA IC. Note that the tamper prevention and detection circuitry is not shown.

Figure 10:
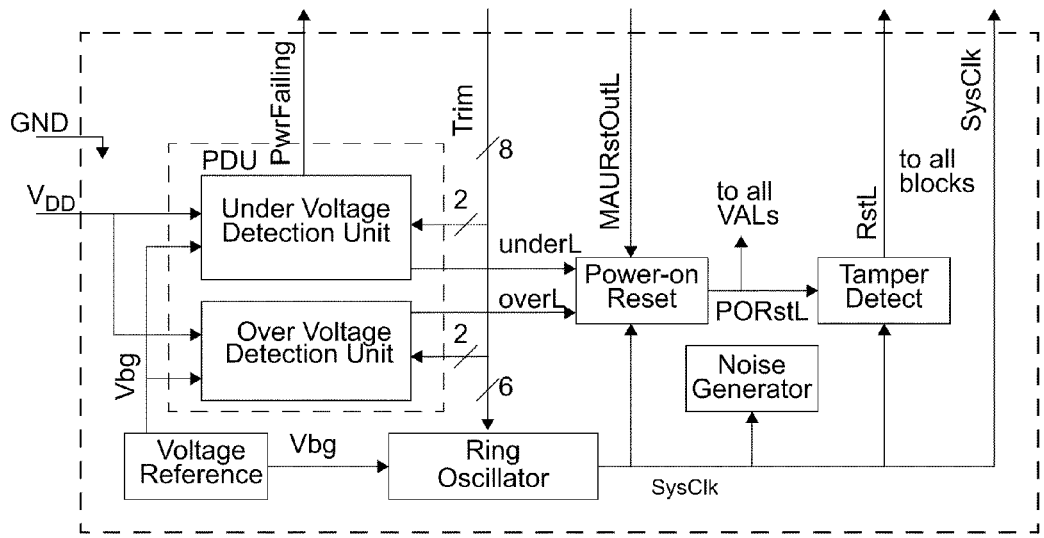
FIG. 10 shows an analogue unit

FIG. 10 shows a block diagram of the Analogue Unit. Blocks shown in yellow provide additional protection against physical and electrical attack and, depending on the level of security required, may optionally be implemented.

The operating clock of the chip (SysClk) is generated by an internal ring oscillator whose frequency can be trimmed to reduce the variation from 4:1 (due to process and temperature) down to 2:1 (temperature variations only) in order to satisfy the timing requirements of the Flash memory.

The length of the ring depends on the process used for manufacturing the chip. A nominal operating frequency range of 10 MHz is sufficient. This clock should contain a small amount of randomization to prevent attacks where light emissions from switching events are captured.

Note that this is different to the input SClk which is the serial clock for external communication.

The ring oscillator is covered by both Tamper Detection and Prevention lines so that if an attacker attempts to tamper with the unit, the chip will either RESET or erase all secret information.

The voltage reference block maintains an output which is substantially independant of process, supply voltage and temperature. It provides a reference voltage which is used by the PDU and a reference current to stabilise the ring oscillator. It may also be used as part of the temperature based clock filter.

The Under Voltage Detection Unit provides the signal PwrFailing which, if asserted, indicates that the power supply may be turning off. This signal is used to rapidly terminate any Flash write that may be in progress to avoid accidentally writing to an indeterminate memory location. Note that the PDU triggers the RESET Tamper Detection Line only. It does not trigger the Erase Tamper Detection Line.

The PDU can be implemented with regular CMOS, since the key does not pass through this unit. It does not have to be implemented with non-flashing CMOS.

The PDU is covered by both Tamper Detection and Prevention lines so that if an attacker attempts to tamper with the unit, the chip will either RESET or erase all secret information. The Power-on Reset unit (POR) detects a power-on condition and generates the PORstL signal that is fed to all the validation units, including the two inside the Tamper Detect Unit (TDU). All other logic is connected to RstL, which is the PORstL gated by the VAL unit attached to the Reset tamper detection lines within the TDU. Therefore, if the Reset tamper line is asserted, the validation will drive RstL low, and can only be cleared by a power-down. If the tamper line is not asserted, then RstL=PORstL.

The TDU contains a second VAL unit attached to the Erase tamper detection lines within the TDU. It produces a TamperEraseOK signal that is output to the MIU (1=the tamper lines are all OK, 0=force an erasure of Flash).

The Noise Generator (NG) is based on a 64-bit maximal period LFSR loaded with a set non-zero bit pattern on RESET.

The NG must be protected by both Tamper Detection and Prevention lines so that if an attacker attempts to tamper with the unit, the chip will either RESET or erase all secret information. In addition, the bits in the LFSR must be validated to ensure they have not been tampered with (i.e. a parity check). If the parity check fails, the Erase Tamper Detection Line is triggered. Finally, all 64 bits of the NG are ORed into a single bit. If this bit is 0, the Erase Tamper Detection Line is triggered. This is because 0 is an invalid state for an LFSR.

The 8-bit Trim register within the Trim Unit has a reset value of 0x00 (to enable the flash reads to succeed even in the fastest process corners), and is written to either by the PMU during Trim Mode or by the CPU in Active Mode. Note that the CPU is only able to write once to the Trim register between power-on-reset due to the TrimDone flag which provides overloading of LocalIdWE.

Figure 11:
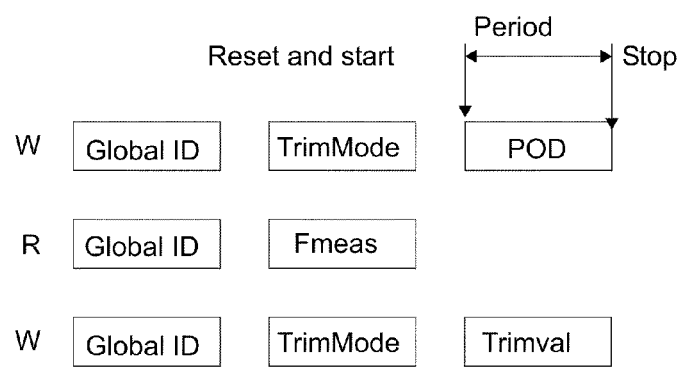
FIG. 11 shows a serial bus protocol for trimming

The reset value of Trim (0) means that the chip has a nominal frequency of 2.7 MHz-10 MHz. The upper of the range is when we cannot trim it lower than this (or we could allow some spread on the acceptable trimmed frequency but this will reduce our tolerance to ageing, voltage and temperature which is the range 7 MHz to 14 MHz). The 2.7 MHz value is determined by a chip whose oscillator runs at 10 MHz when the trim register is set to its maximum value, so then it must run at 2.7 MHz when trim=0. This is based on the non-linear frequency-current characteristic of the oscillator. Chips found outside of these limits will be rejected. The frequency of the ring oscillator is measured by counting cycles, in the PMU, over the byte period of the serial interface. Note that the PMU counts using 12-bits, saturates at 0xFFF, and returns the cycle count divided by 2 as an 8-bit value. This means that multiple measure-read-trim cycles may be necessary to resolve any amibguity. In any case, multiple cycles are necessary to test the correctness of the trim circuitry during manufacture test. The frequency of the serial clock, SClk, and therefore the byte period will be accurately controlled during the measurement. The cycle count (Fmeas) at the end of the period is read over the serial bus and the Trim register updated (Trimval) from its power on default (POD) value. The steps are shown in FIG. 11. Multiple measure-read-trim cycles are possible to improve the accuracy of the trim procedure.

A single byte for both Fmeas and Trimval provide sufficient accuracy for measurement and trimming of the frequency. If the bus operates at 400 kHz, a byte (8 bits) can be sent in 20 s. By dividing the maximum oscillator frequency, expected to be 20 MHz, by 2 results in a cycle count of 200 and 50 for the minimum frequency of 5 MHz resulting in a worst case accuracy of 2%.

Figure 12:
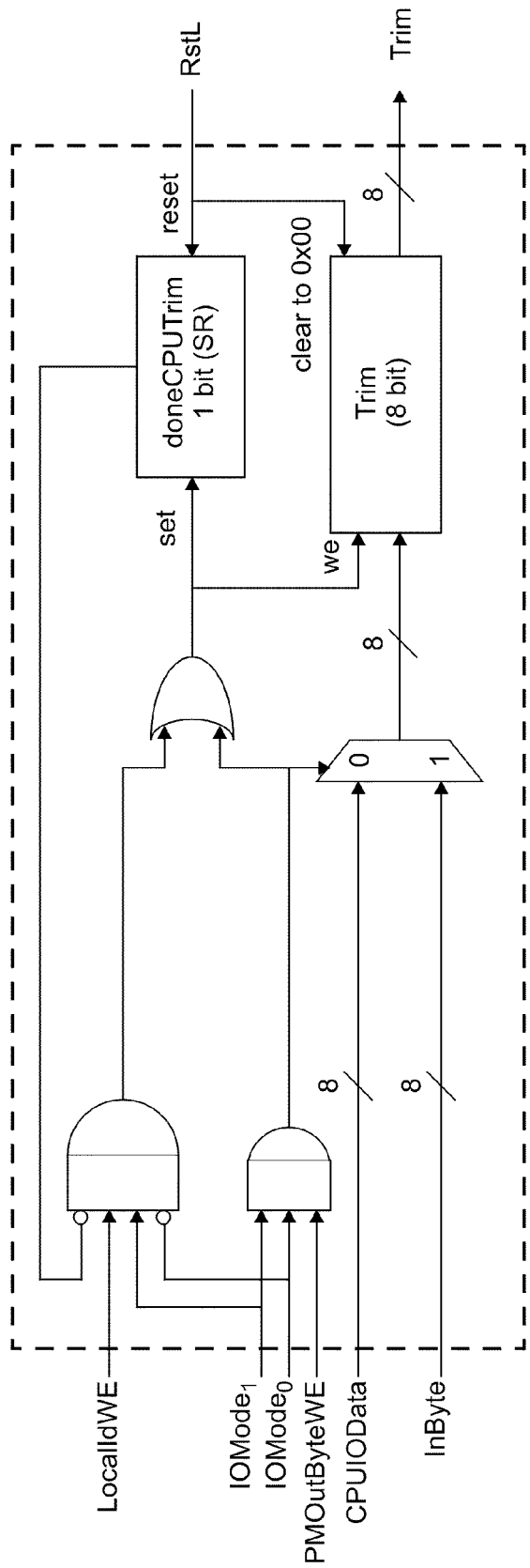
FIG. 12 shows a block diagram of a trim unit

FIG. 12 shows a block diagram of the Trim Unit:

The 8-bit Trim value is used in the analog Trim Block to adjust the frequency of the ring oscillator by controlling its bias current. The two lsbs are used as a voltage trim, and the 6 msbs are used as a frequency trim.

The analog Trim Clock circuit also contains a Temperature filter.

The QA IC acts as a slave device, accepting serial data from an external master via the IO Unit (IOU). Although the IOU actually transmits data over a 1-bit line, the data is always transmitted and received in 1-byte chunks.

The IOU receives commands from the master to place it in a specific operating mode, which is one of:

Idle Mode: is the startup mode for the IOU if the fuse has not yet been blown. Idle Mode is the mode where the QA IC is waiting for the next command from the master. Input signals from the CPU are ignored.

Program Mode: is where the QA IC erases all currently stored data in the Flash memory (program and secret key information) and then allows new data to be written to the Flash. The IOU stays in Program Mode until told to enter another mode.

Active Mode: is the startup mode for the IOU if the fuse has been blown (the program is safe to run). Active Mode is where the QA IC allows the program code to be executed to process the master's specific command. The IOU returns to Idle Mode automatically when the command has been processed, or if the time taken between consuming input bytes (while the master is writing the data) or generating output bytes (while the master is reading the results) is too great.

Trim Mode: is where the QA IC allows the generation and setting of a trim value to be used on the internal ring oscillator clock value. This must be done for safety reasons before a program can be stored in the Flash memory.

Figure 13:
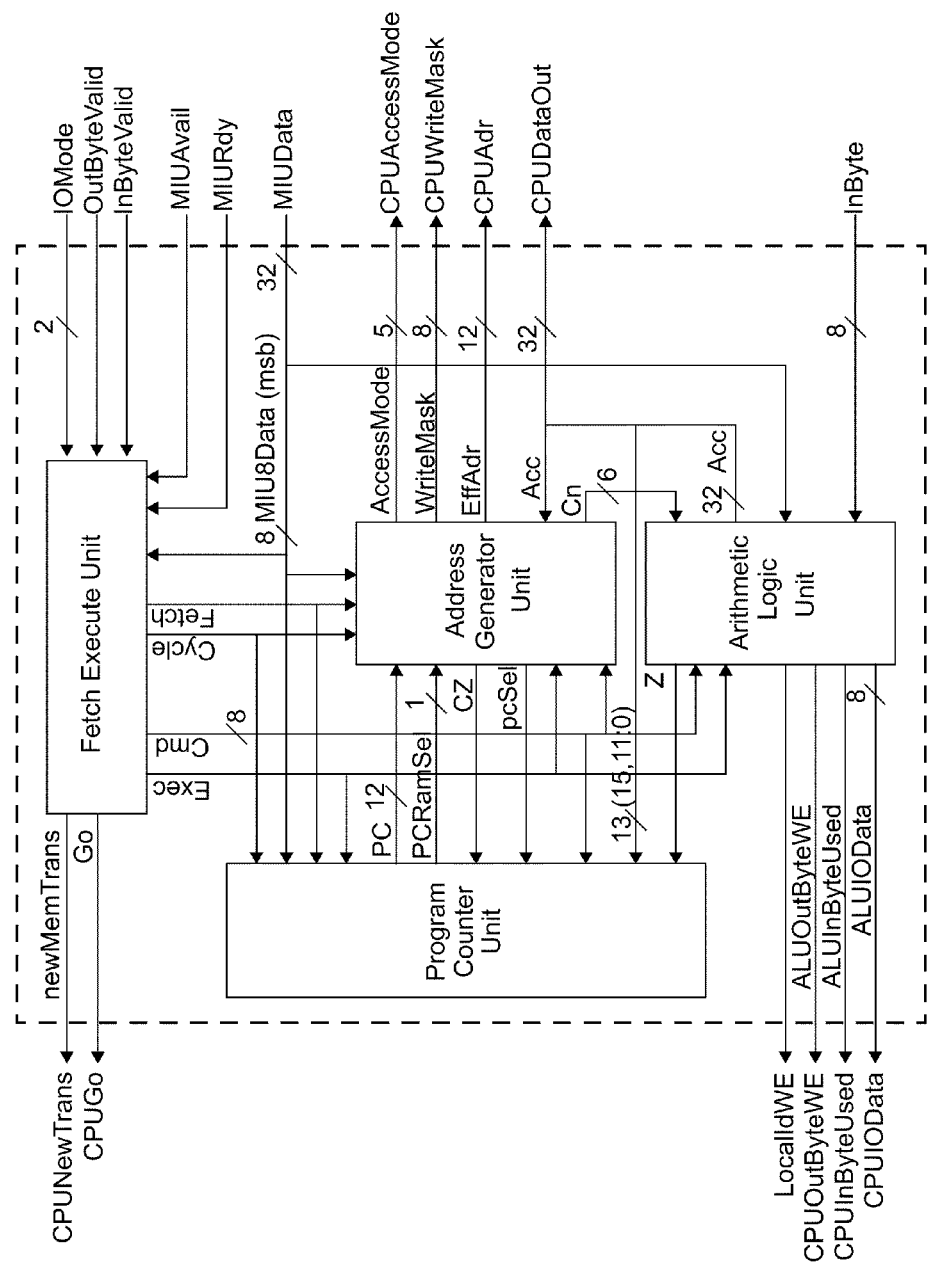
FIG. 13 shows a block diagram of a CPU of the QA chip

The Central Processing Unit (CPU) block provides the majority of the circuitry of the 4-bit microprocessor. FIG. 13 shows a high level view of the block.

The Memory Interface Unit (MIU) provides the interface to flash and RAM. The MIU contains a Program Mode Unit that allows flash memory to be loaded via the IOU, a Memory Request Unit that maps 8-bit and 32-bit requests into multiple byte based requests, and a Memory Access Unit that generates read/write strobes for individual accesses to the memory.

Figure 14:
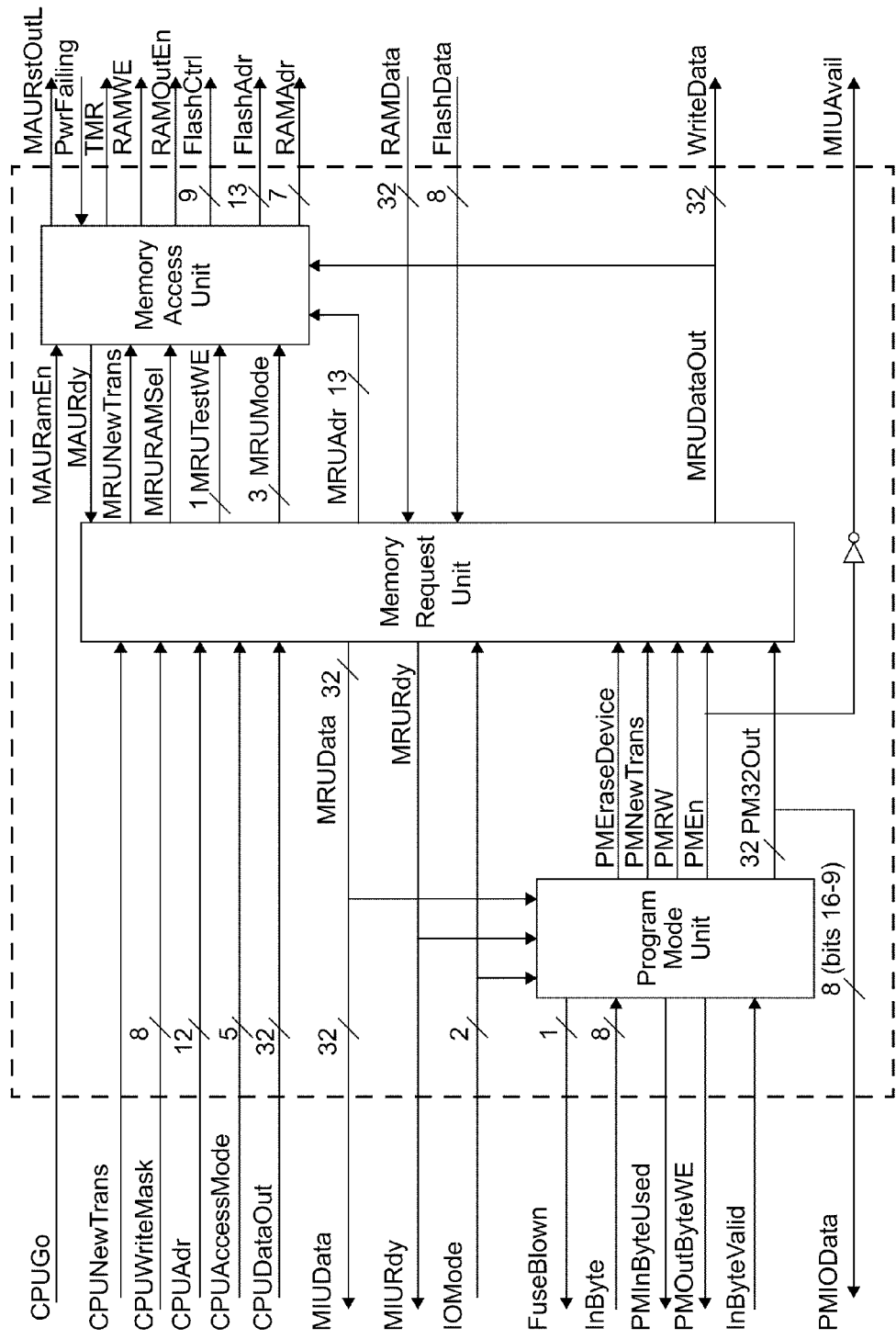
FIG. 14 shows block diagram of an MIU

FIG. 14 shows a high level view of the MIU block.

The Memory Components block isolates the memory implementation from the rest of the QA IC. The entire contents of the Memory Components block must be protected from tampering. Therefore the logic must be covered by both Tamper Detection Lines. This is to ensure that program code, keys, and intermediate data values cannot be changed by an attacker. The 8-bit wide RAM also needs to be parity-checked.

Figures 15, 16:
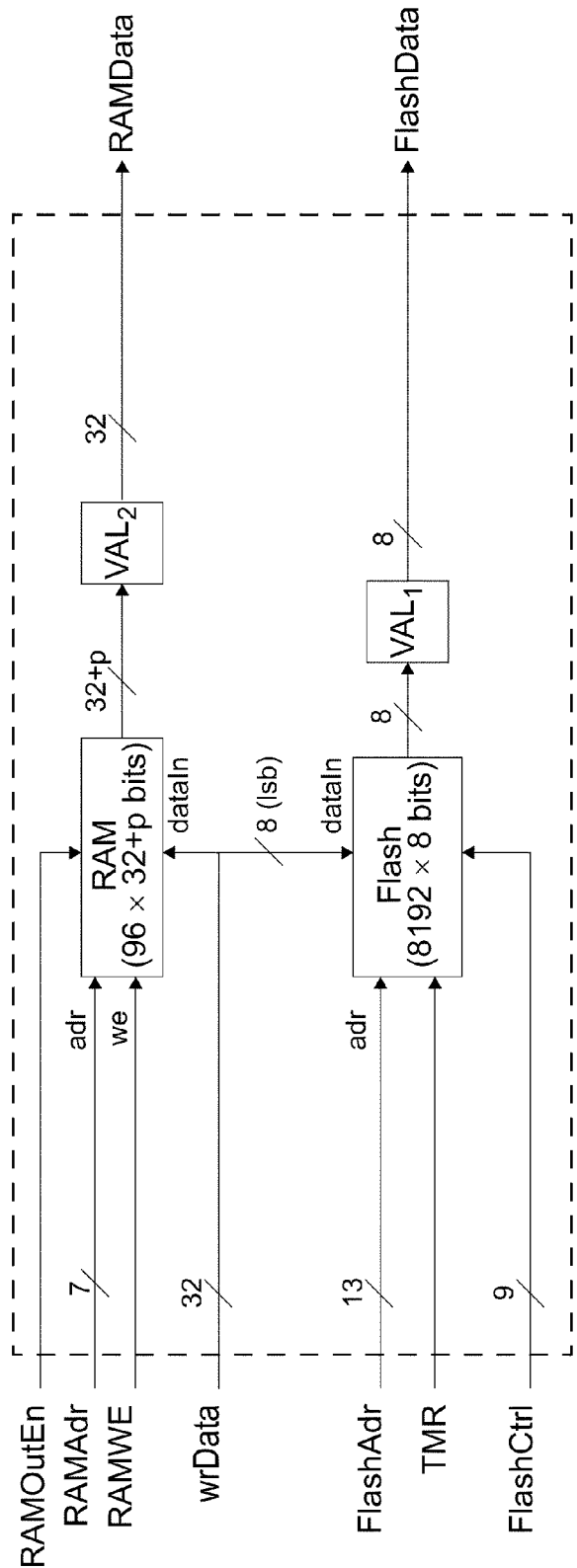
FIG. 15 shows a block diagram of memory components
FIG. 16 shows a first byte sent to an IOU

FIG. 15 shows a high level view of the Memory Components block. It consists of 8 KBytes of flash memory and 3072 bits of parity checked RAM.

The RAM block is shown here as a simple 96×32-bit RAM (plus parity included for verification). The parity bit is generated during the write.

The RAM is in an unknown state after RESET, so program code cannot rely on RAM being 0 at startup.

The initial version of the ASIC has the RAM implemented by Artisan component RA1SH (96×32-bit RAM without parity). Note that the RAMOutEn port is active low i.e. when 0, the RAM is enabled, and when 1, the RAM is disabled.

A single Flash memory block is used to hold all non-volatile data. This includes program code and variables. The Flash memory block is implemented by TSMC component SFC0008_08B9_HE, which has the following characteristics:

8K×8-bit main memory, plus 128×8-bit information memory
512 byte page erase
Endurance of 20,000 cycles (min)
Greater than 100 years data retention at room temperature
Access time: 20 ns (max)
Byte write time: 20 s (min)
Page erase time: 20 ms (min)
Device erase time: 200 ms (min)
Area of 0.494 mm$^2$ (724.66 m×682.05 m)

The FlashCtrl line are the various inputs on the SFC0008-08B9_HE required to read and write bytes, erase pages and erase the device. A total of 9 bits are required.

Flash values are unchanged by a RESET. After manufacture, the Flash contents must be considered to be garbage. After an erasure, the Flash contents in the SFC0008_08B9_HE is all 1s.

The two VAL units are validation units connected to the Tamper Prevention and Detection circuitry, each with an OK bit. The OK bit is set to 1 on PORstL, and ORed with the ChipOK values from both Tamper Detection Lines each cycle. The OK bit is ANDed with each data bit that passes through the unit.

In the case of $VAL_1$, the effective byte output from the flash will always be 0 if the chip has been tampered with. This will cause shadow tests to fail, program code will not execute, and the chip will hang.

In the case of $VAL_2$, the effective byte from RAM will always be 0 if the chip has been tampered with, thus resulting in no temporary storage for use by an attacker.

The I/O Unit (IOU) is responsible for providing the physical implementation of the logical interface, moving between the various modes (Idle, Program, Trim and Active) according to commands sent by the master.

The IOU therefore contains the circuitry for communicating externally with the external world via the SClk and SDa pins. The IOU sends and receives data in 8-bit chunks. Data is sent serially, most significant bit (bit 7) first through to least significant bit (bit 0) last. When a master sends a command to an QA IC, the command commences with a single byte containing an id in bits 7-1, and a read/write sense in bit 0, as shown in FIG. 16.

The IOU recognizes a global id of 0x00 and a local id of LocalId (set after the CPU has executed program code at reset or due to a global id/ActiveMode command on the serial bus).

Subsequent bytes contain modal information in the case of global id, and command/data bytes in the case of a match with the local id.

If the master sends data too fast, then the IOU will miss data, since the IOU never holds the bus. The meaning of too fast depends on what is running. In Program Mode, the master must send data a little slower than the time it takes to write the byte to flash (actually written as 2×8-bit writes, or 40 s). In ActiveMode, the master is permitted to send and request data at rates up to 500 KHz.

None of the latches in the IOU need to be parity checked since there is no advantage for an attacker to destroy or modify them.

The IOU outputs 0s and inputs 0s if either of the Tamper Detection Lines is broken. This will only come into effect if an attacker has disabled the RESET and/or erase circuitry, since breaking either Tamper Detection Lines should result in a RESET or the erasure of all Flash memory.

The IOU's InByte, InByteValid, OutByte, and OutByteValid registers are used for communication between the master and the QA IC. InByte and InByteValid provide the means for clients to pass commands and data to the QA IC. OutByte and OutByteValid provide the means for the master to read data from the QA IC.

Reads from InByte should wait until InByteValid is set. InByteValid will remain clear until the master has written the next input byte to the QA IC. When the IOU is told (by the FEU or MU) that InByte has been read, the IOU clears the InByteValid bit to allow the next byte to be read from the client.

Writes to OutByte should wait until OutByteValid is clear. Writing OutByte sets the OutByteValid bit to signify that data is available to be transmitted to the master. OutByteValid will then remain set until the master has read the data from OutByte. If the master requests a byte but OutByteValid is clear, the IOU sends a NAck to indicate the data is not yet ready.

When the chip is reset via RstL, the IOU enters ActiveMode to allow the PMU to run to load the fuse. Once the fuse has been loaded (when MIUAvail transitions from 0 to 1) the IOU checks to see if the program is known to be safe. If it is not safe, the IOU reverts to IdleMode. If it is safe (FuseBlown=1), the IOU stays in ActiveMode to allow the program to load up the localId and do any other reset initialization, and will not process any further serial commands until the CPU has written a byte to the OutByte register (which may be read or not at the discretion of the master using a localId read). In both cases the master is then able to send commands to the QA IC.

Figure 17:
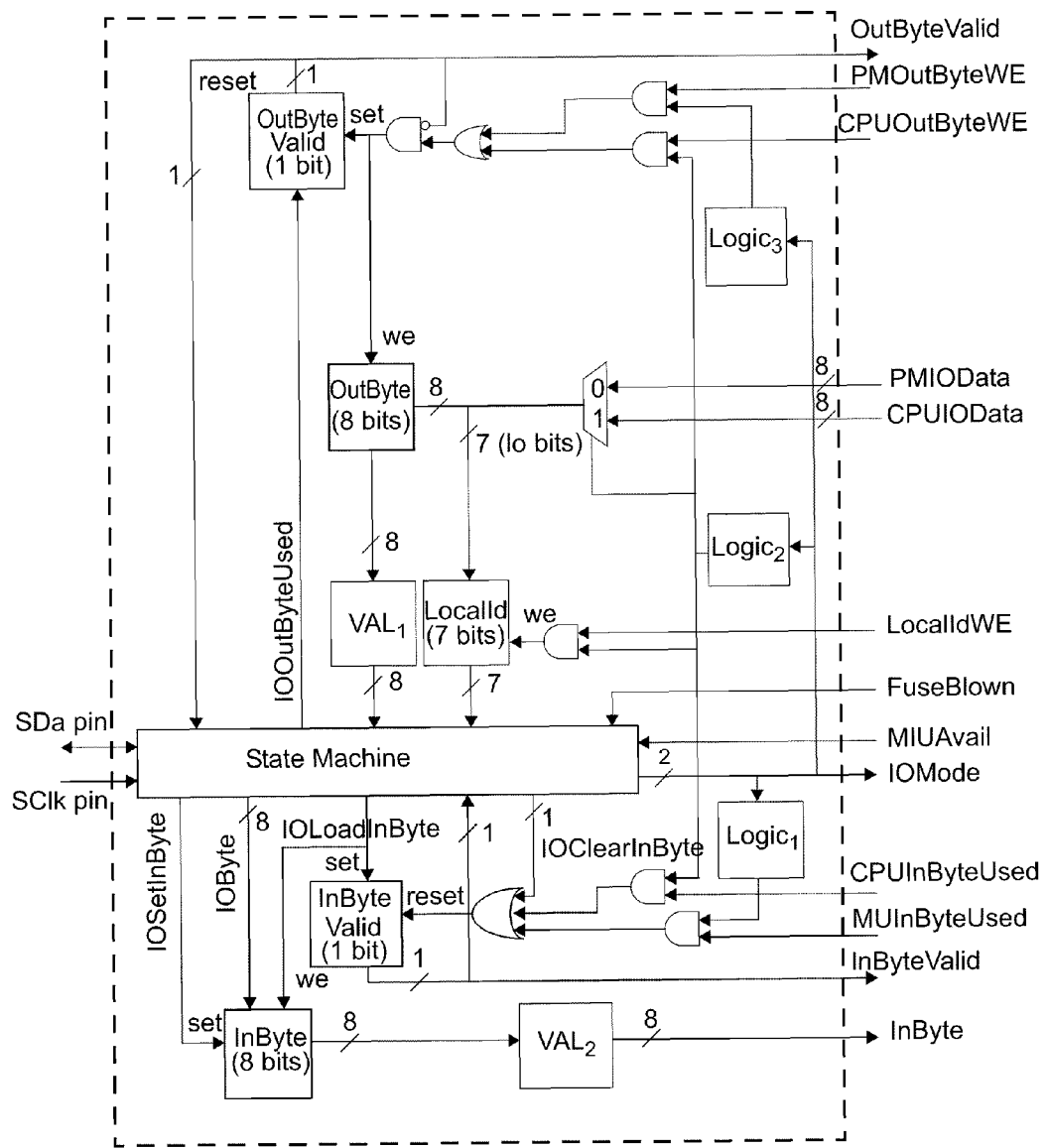
FIG. 17 shows a block diagram of the IOU
Figure 18:
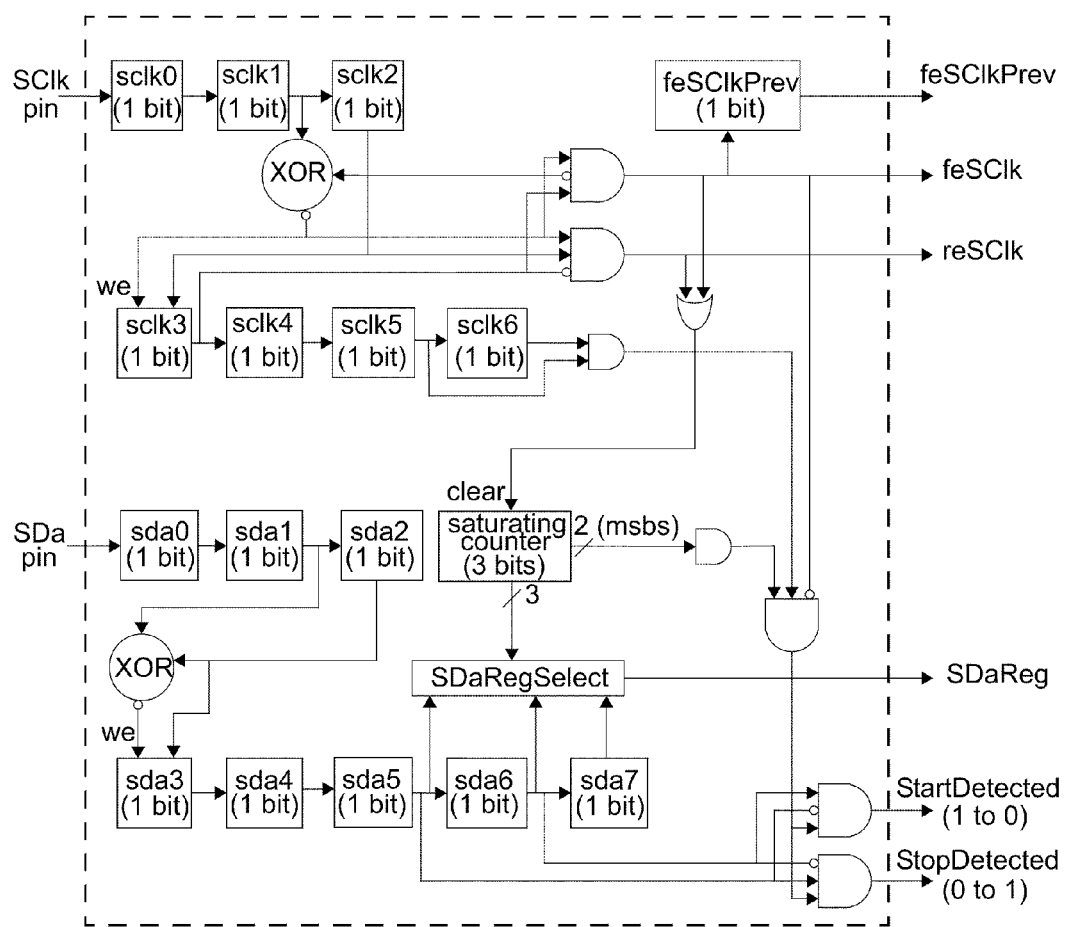
FIG. 18 shows a relationship between external SDa and SClk and generation of internal signals
Figure 19:
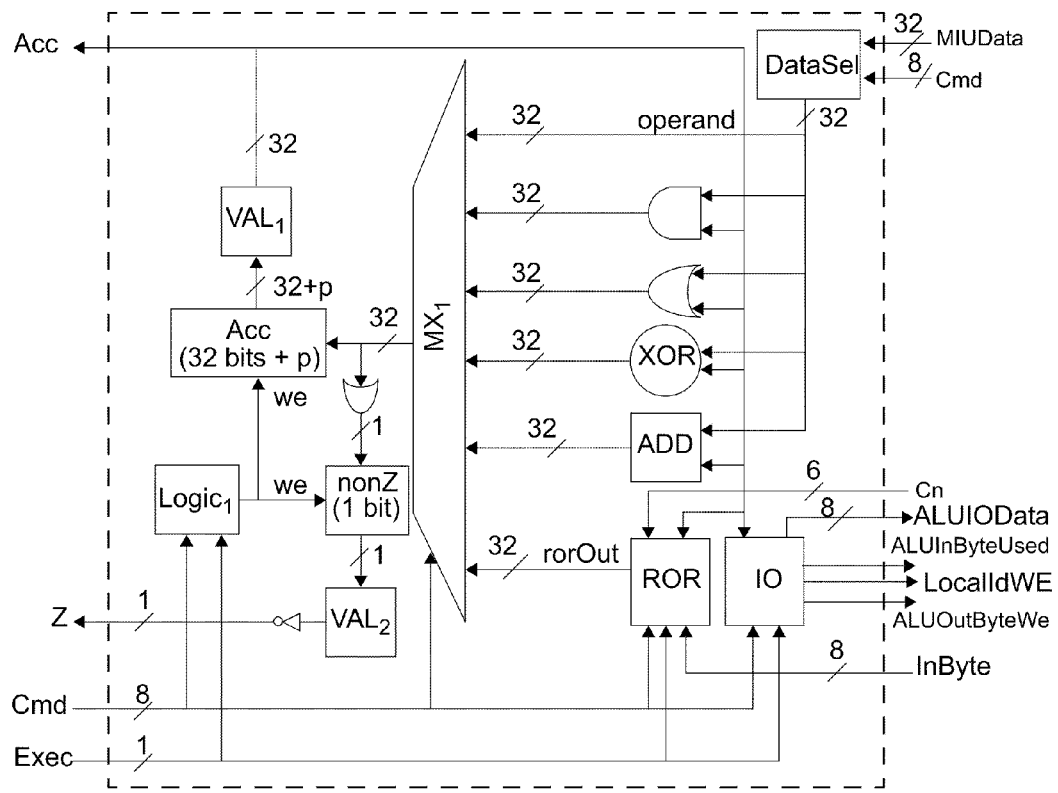
FIG. 19 shows block diagram of ALU
Figure 20:
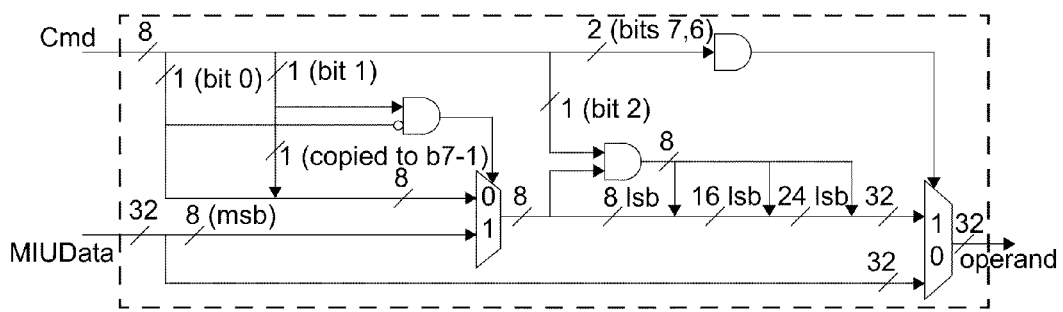
FIG. 20 shows a block diagram of DataSel
Figure 21:
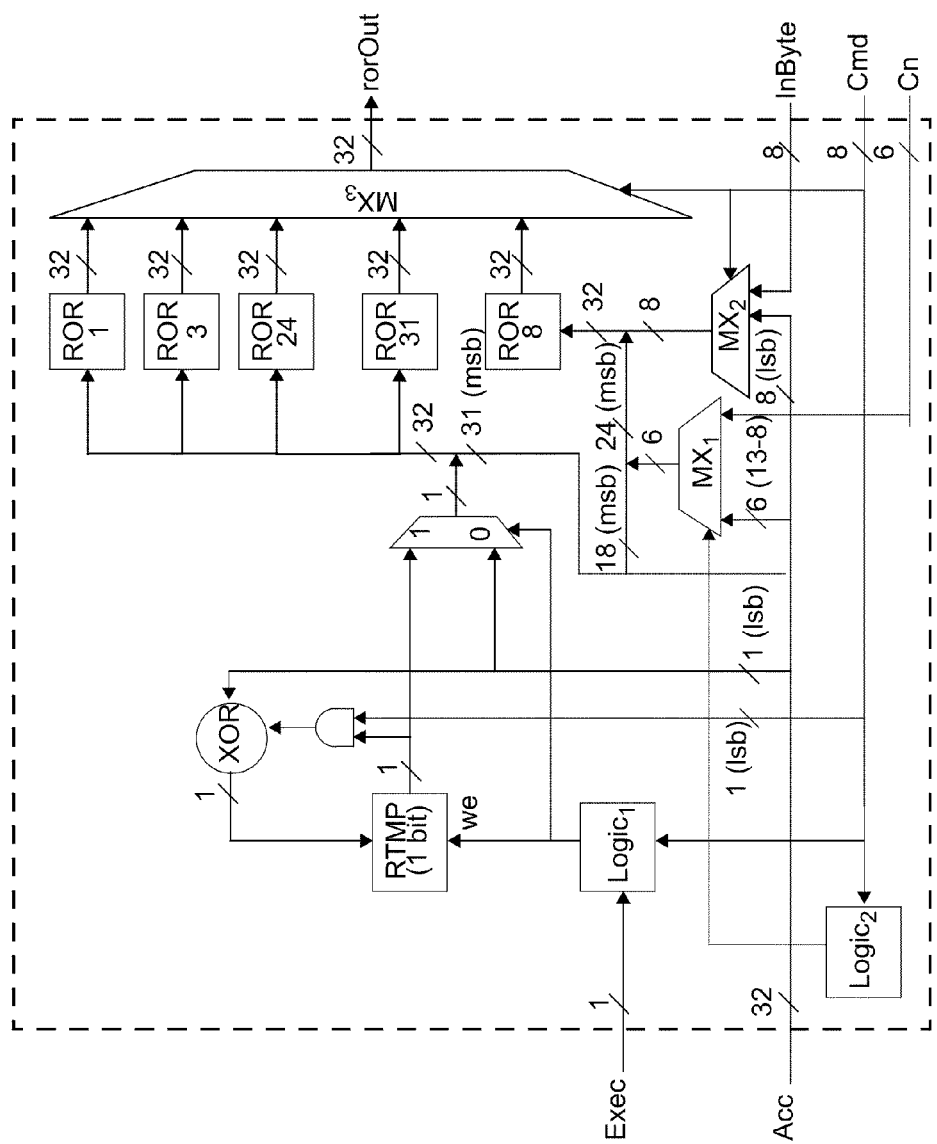
FIG. 21 shows a block diagram of ROR
Figure 22:
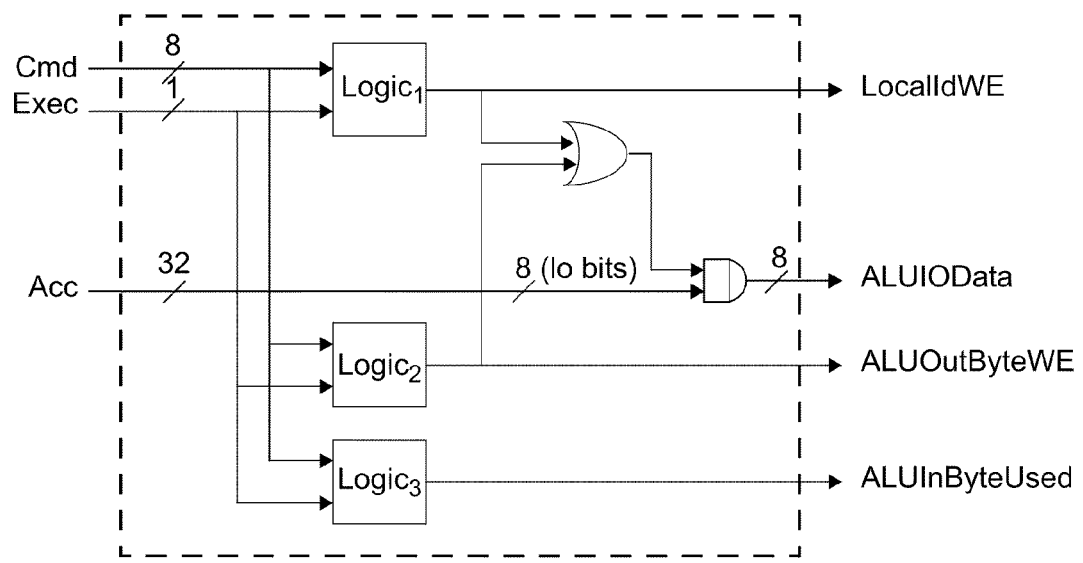
FIG. 22 shows a block diagram of the ALU's IO block
Figure 23:
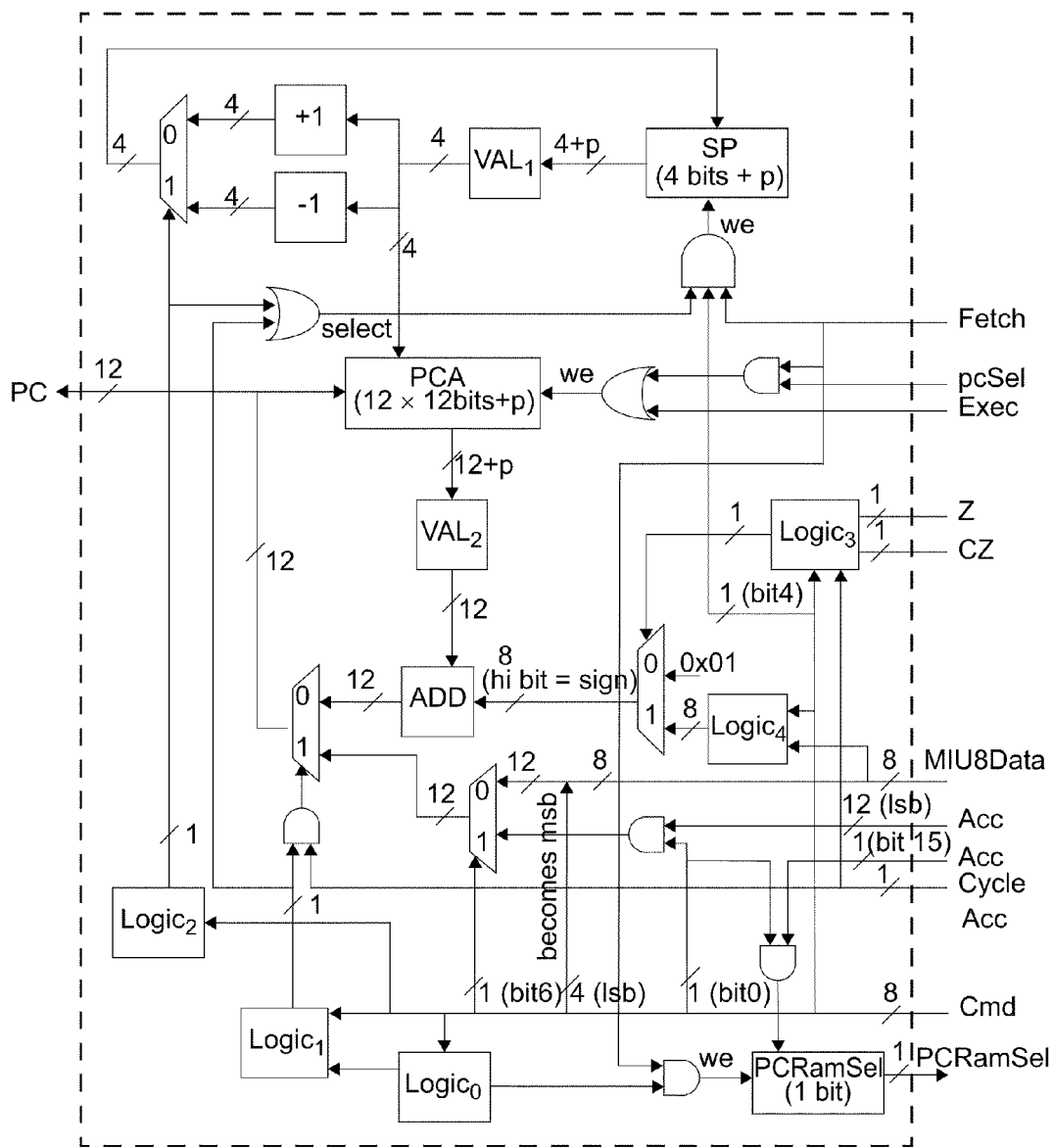
FIG. 23 shows a block diagram of PCU
Figure 24:
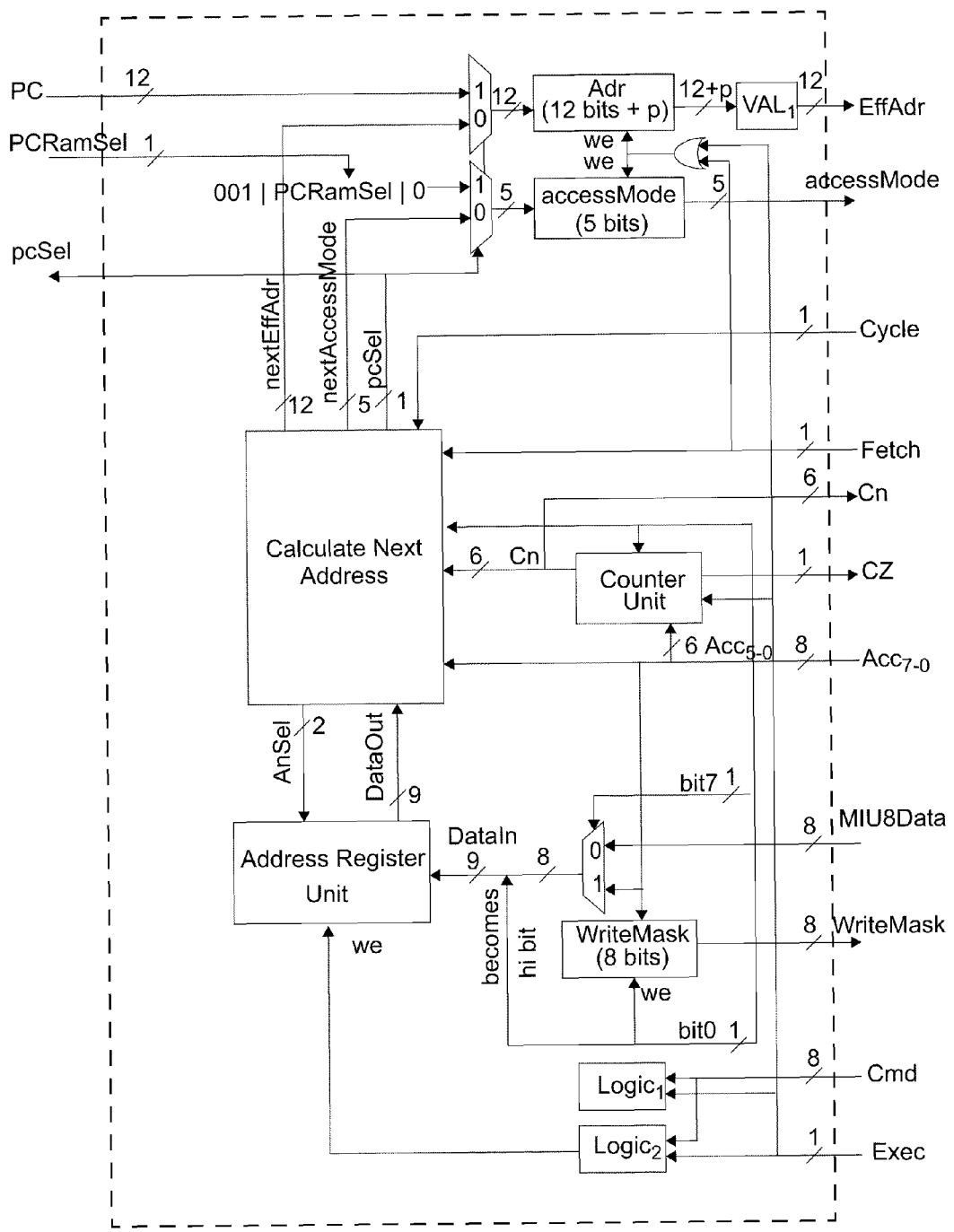
FIG. 24 shows a block diagram of an Address Generator Unit
Figure 25:
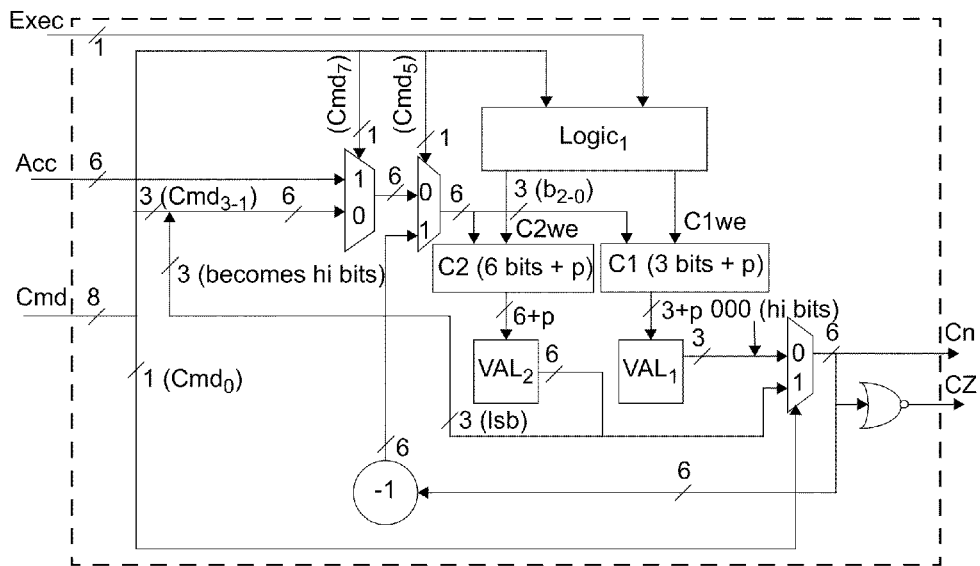
FIG. 25 shows a block diagram for a Counter Unit

FIG. 17 shows a block diagram of the IOU.

With regards to InByteValid inputs, set has priority over reset, although both set and reset in correct operation should never be asserted at the same time. With regards to IOSetInByte and IOLoadInByte, if IOSetInByte is asserted, it will set InByte to be 0xFF regardless of the setting of IOLoadInByte.

The two VAL units are validation units connected to the Tamper Prevention and Detection circuitry, each with an OK bit. The OK bit is set to 1 on PORstL, and ORed with the ChipOK values from both Tamper Detection Lines each cycle. The OK bit is ANDed with each data bit that passes through the unit.

In the case of $VAL_1$, the effective byte output from the chip will always be 0 if the chip has been tampered with. Thus no useful output can be generated by an attacker. In the case of $VAL_2$, the effective byte input to the chip will always be 0 if the chip has been tampered with. Thus no useful input can be chosen by an attacker.

There is no need to verify the registers in the IOU since an attacker does not gain anything by destroying or modifying them.

The current mode of the IOU is output as a 2-bit IOMode to allow the other units within the QA IC to take correct action. IOMode is defined as shown in Table 12:

TABLE 12

| IOMode values | |
|---|---|
| Value | Interpretation |
| 00 | Idle Mode |
| 01 | Program Mode |
| 10 | Active Mode |
| 11 | Trim Mode |

The Logic blocks generate a 1 if the current IOMode is in Program Mode, Active Mode or Trim Mode respectively. The logic blocks are:

| | |
|---|---|
| $Logic_1$ | IOMode = 01 (Program) |
| $Logic_2$ | IOMode = 10 (Active) |
| $Logic_3$ | IOMode = 11 (Trim) |

The Program Mode Unit (PMU) is responsible for Program Mode and Trim Mode operations:

Program Mode involves erasing the existing flash memory and loading the new program/data into the flash. The program that is loaded can be a bootstrap program if desired, and may contain additional program code to produce a digital signature of the final program to verify that the program was written correctly (e.g. by producing a SHA-1 signature of the entire flash memory).

Trim Mode involves counting the number of internal cycles that have elapsed between the entry of Trim Mode (at the falling edge of the ack) and the receipt of the next byte (at the falling edge of the last bit before the ack) from the Master. When the byte is received, the current count value divided by 2 is transmitted to the Master.

The PMU relies on a fuse (implemented as the value of word 0 of the flash information block) to determine whether it is allowed to perform Program Mode operations. The purpose of this fuse is to prevent easy (or accidental) reprogramming of QA ICs once their purpose has been set. For example, an attacker may want to reuse chips from old consumables. If an attacker somehow bypasses the fuse check, the PMU will still erase all of flash before storing the desired program. Even if the attacker somehow disconnects the erasure logic, they will be unable to store a program in the flash due to the shadow nybbles.

The PMU contains an 8-bit buff register that is used to hold the byte being written to flash and a 12-bit adr register that is used to hold the byte address currently being written to.

The PMU is also used to load word 1 of the information block into a 32-bit register (combined from 8-bits of buff, 12-bits of adr, and a further 12-bit register) so it can be used to XOR all data to and from memory (both Flash and RAM) for future CPU accesses. This logic is activated only when the chip enters ActiveMode (so as not to access flash and possibly cause an erasure directly after manufacture since shadows will not be correct). The logic and 32-bit mask register is in the PMU to minimize chip area.

The PMU therefore has an asymmetric access to flash memory:
writes are to main memory
reads are from information block memory The reads and writes are automatically directed appropriately in the MRU.

Figure 26:
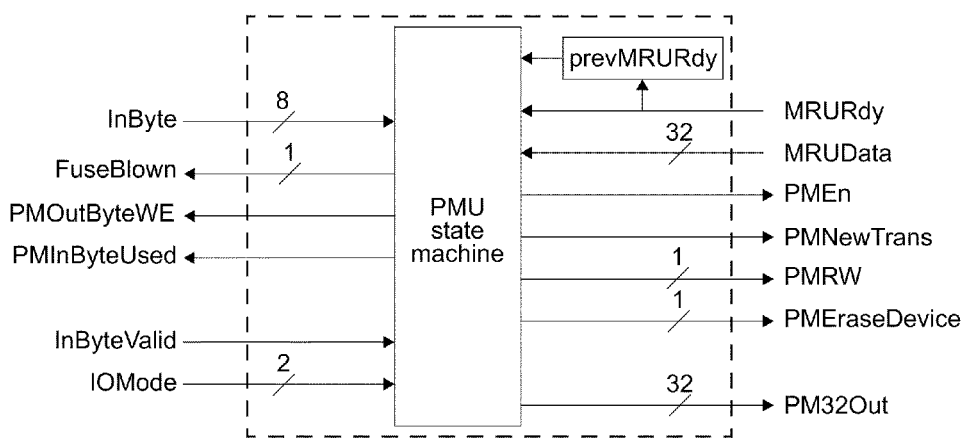
FIG. 26 shows a block diagram of PMU
Figure 27:
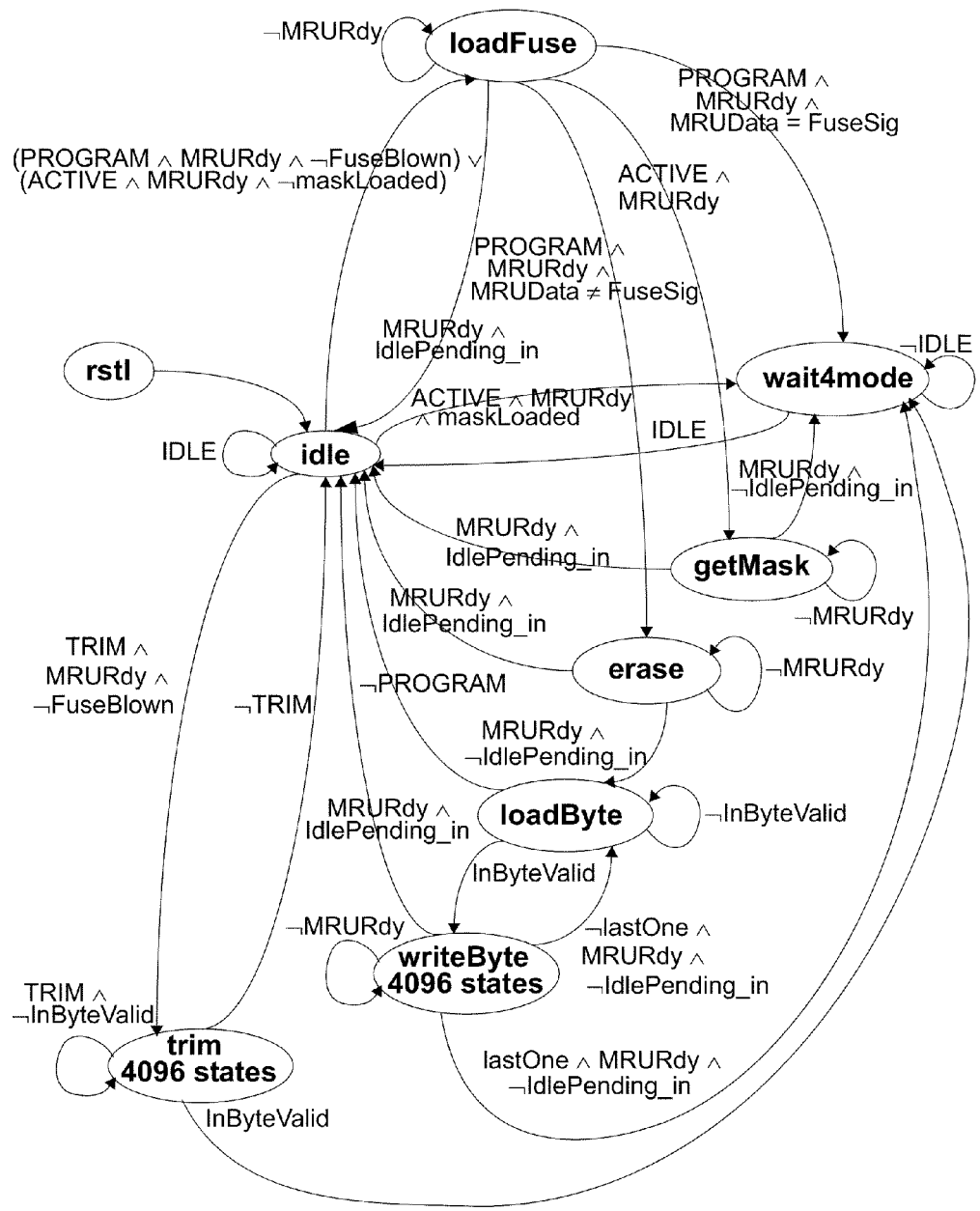
FIG. 27 shows a state machine for PMU
Figure 28:
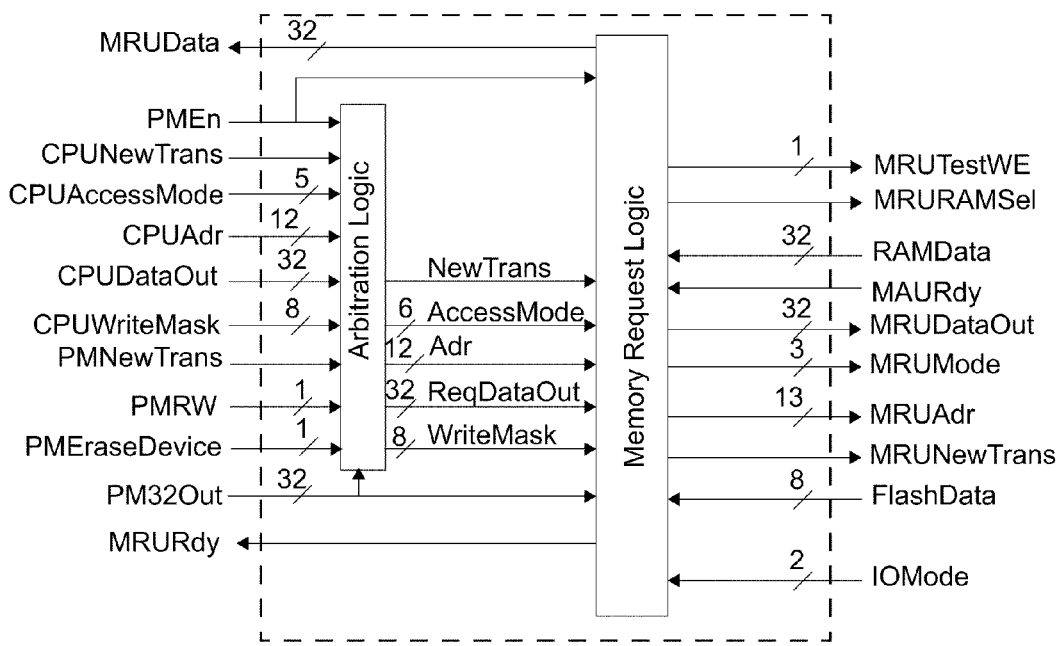
FIG. 28 shows a block diagram of MRU
Figure 29:
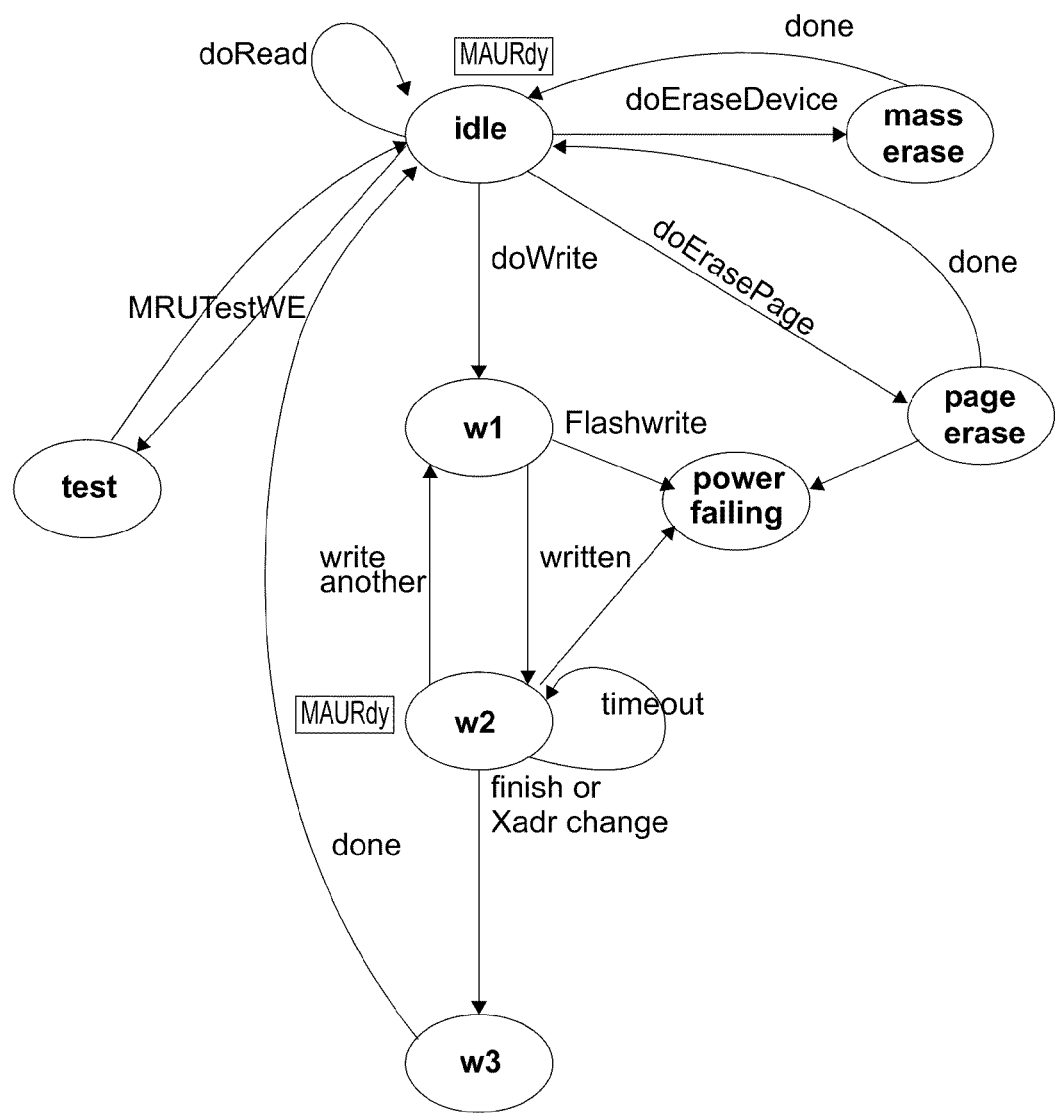
FIG. 29 shows simplified MAU state machine
Figure 30:
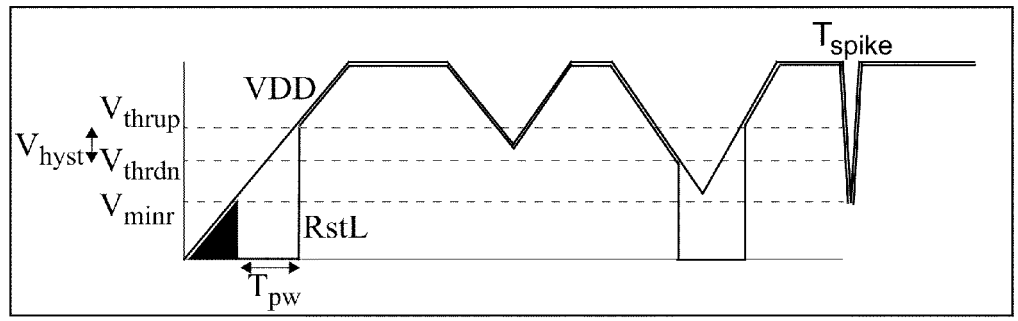
FIG. 30 shows power-on reset behaviour

A block diagram of the PMU is shown in FIG. 26.

Circuits need to operate over the temperature range −40° C. to +125° C.

The unit provides power on reset, protection of the Flash memory against erroneous writes during power down (in conjunction with the MAU) and the system clock SysClk.

The table below shows the key thresholds for $V_{DD}$ which define the requirements for power on reset and normal operation.

TABLE 13

$V_{DD}$ limits

| VDD parameter | Description | Voltage |
|---|---|---|
| VDDFTmax | Flash test maximum | 3.6[2] |
| VDDFTtyp | Flash test typical | 3.3 |
| VDDFTmin | Flash test minimum | 3.0 |
| VDDmax | Normal operation maximum (typ + 10%) | 2.75[3] |
| VDDtyp | Normal operation typical | 2.5 |
| VDDmin | Normal operation minimum (typ − 5%) | 2.375 |
| VDDPORmax | Power on reset maximum | 2.0[4] |

[2]The voltage VDDFT may only be applied for the times specified in the TSMC Flash memory test document.
[3]Voltage regulators used to derive VDD will typically have symmetric tolerance limits
[4]The minimum allowable voltage for Flash memory operation.
[5]Over PVT, not including offsets This circuit generates a stable voltage that is approximately independent of PVT (process, voltage, temperature) and will typically be implemented as a bandgap. Usually, a startup circuit is required to avoid the stable $V_{bg}=0$ condition. The design should aim to minimise the additional voltage above $V_{bg}$ required for the circuit to operate. An additional output, BGOn, will be provided and asserted when the bandgap has started and indicates to other blocks that the output voltage is stable and may be used.

TABLE 14

Bandgap target performance

| Parameter | Conditions | Min | Typ | Max | Units |
|---|---|---|---|---|---|
| Vbg[5] | typical | 1.2 | 1.23 | 1.26 | V |
| IDD | typical | | 50 | | A |
| Vstart | worst case | 1.6 | | | V |
| Iout | | | | 10 | nA |
| Vtemp | | | +0.1 | | mV/° C. |

Only under voltage detection will be described and is required to provide two outputs:
underL controls the power on reset; and
PwrFailing indicates possible failure of the power supply.

Both signals are derived by comparing scaled versions of $V_{DD}$ against the reference voltage $V_{bg}$. The rising and falling edges of $V_{DD}$ (from the external power supply) shall be monotonic in order to guarantee correct operation of power on reset and power failing detection. Random noise may be present but should have a peak to peak amplitude of less than the hysteresis of the comparators used for detection in the PDU.

The underL signal generates the global reset to the logic which should be de-asserted when the supply voltage is high enough for the logic and analogue circuits to operate. Since the logic reset is asynchronous, it is not necessary to ensure the clock is active before releasing the reset or to include any delay.

The QA IC logic will start immediately the power on reset is released so this should only be done when the conditions of supply voltage and clock frequency are within limits for the correct operation of the logic.

The power on reset signal shall not be triggered by narrow spikes (<100 ns) on the power supply. Some immunity should be provided to power supply glitches although since the QA IC may be under attack, any reset delay should be kept short. The unit should not be triggered by logic dynamic current spikes resulting in short voltage spikes due to bond wire and package inductance.

On the rising edge of $V_{DD}$, the maximum threshold for de-asserting the signal shall be when $V_{DD} > V_{DDmin}$. On the falling edge of $V_{DD}$, the minimum threshold for asserting the signal shall be $V_{DD} < V_{DDPORmax}$.

The reset signal must be held low long enough ($T_{pwmin}$) to ensure all flip-flops are reset. The standard cell data sheet gives a figure of 0.73 ns for the minimum width of the reset pulse for all flip-flop types.

2 bits of trimming ($trim_{1-0}$) will be provided to take up all of the error in the bandgap voltage. This will only affect the assertion of the reset during power down since the power on default setting must be used during power up.

Although the reference voltage cannot be directly measured, it is compared against $V_{DD}$ in the PDU. The state of the power on reset signal can be inferred by trying to communicate through the serial bus with the chip. By polling the chip and slowly increasing $V_{DD}$, a point will be reached where the power on reset is released allowing the serial bus to operate; this voltage should be recorded. As $V_{DD}$ is lowered, it will cross the threshold which asserts the reset signal. The power on default is set to the lowest voltage that can be trimmed (which gives the maximum hysteresis). This voltage should be recorded (or it may be sufficient to estimate it from the reset release voltage recorded above). $V_{DD}$ is then increased above the reset release threshold and the PDU trim adjusted to the setting the closest to $V_{DDPORmax}$. $V_{DD}$ should then be lowered and the threshold at which the reset is re-asserted confirmed.

TABLE 15

Power on reset target performance

| Parameter | Conditions | Min | Typ | Max | Units |
|---|---|---|---|---|---|
| Vthrup | T = 27° C. | 2.0 | | 2.375 | V |
| Vthrdn | T = 27° C. | 2.0 | | 2.1 | V |
| Vhystmin | | | 16 | | mV |
| IDD | | | 5 | | A |
| Tspike | | | 100 | | Ns |
| Vminr | | | 0.5 | | V |
| Tpwmin | | 1 | | | Ns |

Power on Reset Behaviour

The signal PwrFailing will be used to protect the Flash memory by turning off the charge pump during a write or page erase if the supply voltage drops below a certain threshold. The charge pump is expected to take about 5 us to discharge. The PwrFailing signal shall be protected against narrow spikes (<100 ns) on the power supply.

The nominal threshold for asserting the signal needs to be in the range $V_{PORmax} < V_{DDPFtyp} < V_{DDmin}$ so is chosen to be asserted when $V_{DD} < V_{DDPFtyp} = V_{DDPORmax} + 200$ mV. This infers a $V_{DD}$ slew rate limitation which must be <200 mV/5 us to ensure enough time to detect that power is failing before the supply drops too low and the reset is activated. This requirement must be met in the application by provision of adequate supply decoupling or other means to control the rate of descent of $V_{DD}$.

TABLE 16

Power failing detection target performance

| Parameter | Conditions | Min | Typ | Max | Units |
|---|---|---|---|---|---|
| Vthr | T = 27° C. | 2.1 | 2.2 | 2.3 | V[6] |
| Vhyst | | | 16 | | mV |
| IDD | | | 5 | | A |
| Tspike | | | 100 | | Ns |
| Vminr | | | 0.5 | | V |

[6]These limits are after trimming and include an allowance for VDD ramping.

2 bits of trimming (trim$_{1-0}$) will be provided to take up all of the error in the bandgap voltage.

SysClk is required to be in the range 7-14 MHz throughout the lifetime of the circuit provided $V_{DD}$ is maintained within the range $V_{DDMIN} < V_{DD} < V_{DDMAX}$. The 2:1 range is derived from the programming time requirements of the TSMC Flash memory. If this range is exceeded, the useful lifetime of the Flash may be reduced.

The first version of the QA IC, without physical protection, does not require the addition of random jitter to the clock. However, it is recommended that the ring oscillator be designed in such a way as to allow for the addition of jitter later on with minimal modification. In this way, the un-trimmed centre frequency would not be expected to change.

The initial frequency error must be reduced to remain within the range 10 MHz/1.41 to 10 MHz×1.41 allowing for variation in:
  voltage
  temperature
  ageing
  added jitter
  errors in frequency measurement and setting accuracy The range budget must be partitioned between these variables.

Figure 31:
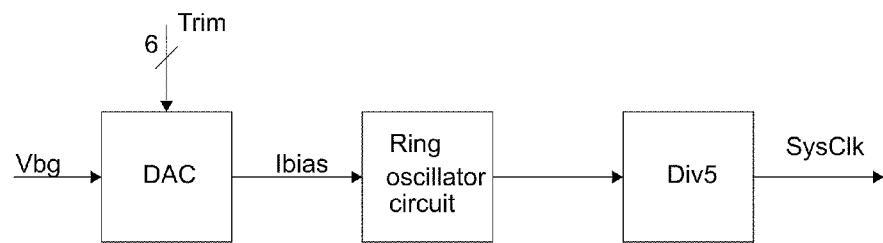
FIG. 31 shows a ring oscillator block diagram
Figure 32:
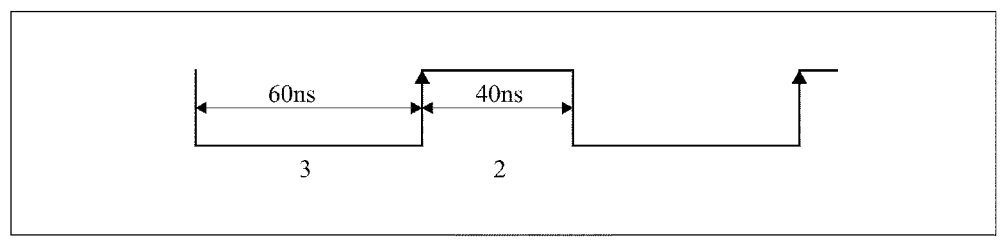
FIG. 32 shows a system clock duty cycle

FIG. 31 is the ring oscillator block diagram

The above arrangement allows the oscillator centre frequency to be trimmed since the bias current of the ring oscillator is controlled by the DAC. SysClk is derived by dividing the oscillator frequency by 5 which makes the oscillator smaller and allows the duty cycle of the clock to be better controlled.

Using $V_{bg}$, this block sources a current that can be programmed by the Trim signal. 6 of the available 8 trim bits will be used (trim$_{7-2}$) giving a clock adjustment resolution of about 250 kHz. The range of current should be such that the ring oscillator frequency can be adjusted over a 4 to 1 range.

TABLE 17

Programmable current source target performance

| Parameter | Conditions | Min | Typ | Max | Units |
|---|---|---|---|---|---|
| Iout | Trim7-2 = 0 | | 5 | | A |
| | Trim7-2 = 32 | | 12.5 | | |
| | | | 20 | | |
| | Trim7-2 = 63 | | | | |
| Vrefin | | | 1.23 | | V |
| Rout | Trim7-2 = 63 | 2.5 | | | M |

TABLE 18

Ring oscillator target performance

| Parameter | Conditions | Min | Typ | Max | Units |
|---|---|---|---|---|---|
| Fosc[7] | | 7 | 10 | 14 | MHz |
| IDD | | | 10 | | A |
| KI | | | 1 | | MHz/A |
| KVDD | | | +200 | | KHz/V |
| KT | | | +30 | | KHz/° C. |
| Vstart | | 1.5 | | | V |

$K_I$ = control sensitivity,
$K_{VDD}$ = $V_{DD}$ sensitivity,
$K_T$ = temperature sensitivity
[7]Accounting for division by 5

With the figures above, $K_{VDD}$ will give rise to a maximum variation of ±50 kHz and $K_T$ to ±1.8 MHz over the specified range of $V_{DD}$ and temperature.

The ring oscillator will be prescaled by 5 to obtain the nominal 10 MHz clock. An asynchronous design may be used to save power. Several divided clock duty cycles are obtainable, eg 4:1, 3:2 etc. To ease timing requirements for the standard cell logic block, the following clock will be generated; most flip-flops will operate on the rising edge of the clock allowing negative edge clocking to meet memory timing.

TABLE 19

Div5 target performance

| Parameter | Conditions | Min | Typ | Max | Units |
|---|---|---|---|---|---|
| Fmax | Vdd = 1.5 V | 100 | | | MHz |
| IDD | | | 10 | | A |

This block combines the overL (omitted from the current version), underL and MAURstOutL signals to provide the global reset. MAURstOutL is delayed by one clock cycle to ensure a reset generated when this signal is asserted has at least this duration since the reset deasserts the signal itself. It should be noted that the register, with active low reset RN, is the only one in the QA chip not connected to RstL.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

The invention claimed is:

1. A method of controlling a clock signal with a print controller, the method comprising the steps of:
  in response to receiving an external signal, the print controller determining the number of cycles of a clock signal generated by a ring oscillator of the print controller during a predetermined number of cycles of the external signal or the number of cycles of the external signal during a predetermined number of cycles of the clock signal and outputting the determined number of cycles to an external circuit;
  in response to receiving a trim value from clock trim circuitry of the print controller which trims the frequency of the clock signal based on the determined number of cycles from the external circuit, storing the trim value in memory of the print controller; and controlling the clock trim circuitry to trim the frequency of the clock signal generated by the ring oscillator using the trim value.

2. The method according to claim 1, wherein the memory incorporates non-volatile memory, wherein the method includes storing the trim value in the non-volatile memory.

3. The method according to claim 2, where the non-volatile memory is flash RAM, wherein the method includes storing, using a flash write, the trim value to the non-volatile memory.

4. The method according to claim 1, wherein the clock trim circuitry incorporates a register, wherein the method includes, in the processor, loading the trim value from the memory into register.

5. The method according to claim 1, wherein the method includes storing the trim value permanently in the integrated circuit.

6. The method according to claim 1, wherein the method includes operating the integrated circuit under conditions in which the signal for which the number of cycles is being determined is at a considerably higher frequency than the other signal.

7. The method according to claim 6, wherein the method includes operating the integrating circuit when a ratio of the number of cycles determined and the predetermined number of cycles is greater than about 2.

8. The method according to claim 7, wherein the ratio is greater than about 4.

9. The method according to claim 1, wherein in the method includes compensating the trim value based upon a temperature of the integrated circuit during the determination of the number of cycles.

* * * * *